United States Patent
Ge et al.

(10) Patent No.: US 12,035,395 B2
(45) Date of Patent: Jul. 9, 2024

(54) SUL CONFIGURATION METHOD AND COMMUNICATION APPARATUS

(71) Applicant: Huawei Technologies Co., Ltd., Shenzhen (CN)

(72) Inventors: Quan Ge, Shanghai (CN); Liwen Zhang, Shanghai (CN); Zhou Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/643,695

(22) Filed: Dec. 10, 2021

(65) Prior Publication Data

US 2022/0104298 A1    Mar. 31, 2022

Related U.S. Application Data

(63) Continuation of application No. PCT/CN2020/095681, filed on Jun. 11, 2020.

(30) Foreign Application Priority Data

Jun. 11, 2019   (CN) .......................... 201910502868.4

(51) Int. Cl.
   *H04W 76/15*   (2018.01)
   *H04W 24/02*   (2009.01)

(52) U.S. Cl.
   CPC ........... *H04W 76/15* (2018.02); *H04W 24/02* (2013.01)

(58) Field of Classification Search
   CPC ............................. H04W 76/15; H04W 24/02
   See application file for complete search history.

(56) References Cited

U.S. PATENT DOCUMENTS

| | | | |
|---|---|---|---|
| 2019/0132764 A1* | 5/2019 | Nam | H04W 72/0453 |
| 2019/0254073 A1* | 8/2019 | Sheng | H04W 72/23 |
| 2019/0254074 A1* | 8/2019 | Jeon | H04W 74/0833 |

FOREIGN PATENT DOCUMENTS

| | | |
|---|---|---|
| CN | 108370574 A | 8/2018 |
| CN | 109152085 A | 1/2019 |
| CN | 109392181 A | 2/2019 |
| CN | 109803398 A | 5/2019 |
| CN | 109803439 A | 5/2019 |
| CN | 109842953 A | 6/2019 |
| CN | 110337152 A | 10/2019 |
| EP | 3709735 A1 | 9/2020 |
| WO | 2019095944 A1 | 5/2019 |

(Continued)

OTHER PUBLICATIONS

Huawei, et al. "Remaining issues on the PRACH for SUL. 3GPP TSG RAN WGI," Meeting 90bis, Prague, Czech Republic, Oct. 9-13, 2017, R1-1717901, 5 pages.

(Continued)

*Primary Examiner* — Michael A Keller
(74) *Attorney, Agent, or Firm* — SLATER MATSIL, LLP

(57) ABSTRACT

In an embodiment a method includes, after establishing a radio resource control (RRC) connection to an access network device on a first supplementary uplink SUL, receiving configuration information of a second (SUL) from the access network device and initiating random access on the second SUL, wherein a frequency of the second SUL is different from a frequency of the first SUL.

17 Claims, 11 Drawing Sheets

(56) References Cited

FOREIGN PATENT DOCUMENTS

WO 2019099463 A1 5/2019

OTHER PUBLICATIONS

Huawei, HiSilicon, "Motivation for new WI proposal on NR spectrum utilization efficiency enhancements," 3GPP TSG RAN Meeting #79, Chennai, India Mar. 19-22, 2018, RP-180381, 9 pages.
3GPP TS 38.101-1 V15.5.0 (Mar. 2019), 3rd Generation Partnership Project; Technical Specification Group Radio Access Network; NR; User Equipment (UE) radio transmission and reception; Part 1: Range 1 Standalone(Release 15), 239 pages.

\* cited by examiner

SUL CONFIGURATION METHOD AND COMMUNICATION APPARATUS

CROSS-REFERENCE TO RELATED APPLICATIONS

This is a continuation application of International Application No. PCT/CN2020/095681, entitled "Method for Configuring Sul, and Communication Apparatus," filed on Jun. 11, 2020, which claims priority to Chinese Patent Application No. 201910502868.4, filed on Jun. 11, 2019, all of which is incorporated herein by reference.

TECHNICAL FIELD

Embodiments of this application relate to the communication field, and in particular, to a supplementary uplink (SUL) configuration method and a communication apparatus.

BACKGROUND

A SUL is introduced in a new radio (NR) protocol of the 3rd generation partnership project (3GPP). The SUL is mainly used to carry users at an NR coverage edge. Introducing the SUL may supplement uplink coverage for high-frequency NR. A terminal may perform uplink transmission on a normal uplink (NUL) or the SUL. When coverage of an uplink carrier deteriorates, the terminal may switch from the NUL to the SUL.

Currently, a deployed SUL cannot satisfy capacity requirements of the NR edge users. As a result, user experience is affected.

SUMMARY

Embodiments provide a SUL configuration method and a communication apparatus, so that a plurality of SULs can be configured, to improve an uplink user capacity and improve user experience.

According to a first aspect, a SUL configuration method is disclosed. The method includes: after establishing an RRC connection to an access network device on a first SUL, receiving, by a terminal, configuration information of a second SUL from the access network device; and initiating, by the terminal, random access on the second SUL, where a frequency of the second SUL is different from a frequency of the first SUL.

According to the method provided in this embodiment of this application, a plurality of different SULs can be configured for one access network device. A same terminal may perform uplink transmission by accessing the different SULs at different time points, and different terminals may also perform uplink transmission on the different SULs at a same time point. After the terminal performs random access on one SUL, the access network device may send configuration information of another SUL to the terminal, and then the terminal performs random access on the other SUL. By configuring a plurality of SULs, an uplink capacity is improved, and performance of a communication system is improved.

With reference to the first aspect, in a first possible implementation of the first aspect, the configuration information of the second SUL is carried in a radio resource control RRC message.

In the method provided in this embodiment of this application, the access network device may reconfigure an SUL for the terminal by using the RRC message, so that the terminal can work on different SULs, to improve user experience.

With reference to the first aspect or the first possible implementation of the first aspect, in a second possible implementation of the first aspect, the method further includes: after initiating the random access on the second SUL, receiving configuration information of the first SUL from the access network device, and ignoring, by the terminal, the configuration information of the first SUL or storing the configuration information of the first SUL.

In this embodiment of this application, after receiving a changed configuration message from the access network device, the terminal considers by default that an activated SUL is still the SUL (that is, the second SUL described in this embodiment of this application) reconfigured by the access network device by using the RRC message, and configuration information of a currently activated SUL is not overwritten, to ensure that the terminal can normally perform uplink transmission on the second SUL.

With reference to any one of the first aspect or the first to the third possible implementations of the first aspect, in a fourth possible implementation of the third aspect, the method further includes: before initiating random access on the first SUL, receiving N pieces of frequency information of N SULs from the access network device, where the N pieces of frequency information are in a one-to-one correspondence with the N SULs, and the N SULs include the second SUL and the first SUL.

In this embodiment of this application, the access network device may further deliver frequency information of the plurality of SULs configured for the access network device to the terminal, and subsequently may indicate the terminal to switch to another SUL.

With reference to the third possible implementation of the first aspect, in a fourth possible implementation of the first aspect, the configuration information of the second SUL includes the frequency of the second SUL or an index of the second SUL.

In this embodiment of this application, the access network device delivers the frequency information of the plurality of SULs configured for the access network device to the terminal. During subsequent SUL reconfiguration, the frequency information of the SUL may not be delivered, and a frequency of the SUL is indicated by using an index of the SUL.

With reference to the first aspect or the first to the fourth possible implementations of the first aspect, in a fifth possible implementation of the first aspect, the second SUL satisfies one or more of the following conditions: downlink reference signal receive power corresponding to the second SUL is greater than a first threshold, and load of the second SUL is less than a second threshold.

If the second SUL satisfies the foregoing conditions, an SUL suitable for the terminal may be reconfigured for the terminal, to improve terminal experience.

With reference to the first aspect or the first to the fifth possible implementations of the first aspect, in a sixth possible implementation of the first aspect, after the random access is initiated on the second SUL, the RRC connection of the first SUL is disconnected.

According to a second aspect, a communication apparatus is disclosed. The communication apparatus may be a terminal or a chip in the terminal. The communication apparatus may implement the method in the first aspect. The communication apparatus includes: a communication unit, configured to: after establishing an RRC connection to an access network device on a first SUL, receive configuration information of a second SUL from the access network device; and a processing unit, configured to initiate random access on the second SUL, where a frequency of the second SUL is different from a frequency of the first SUL.

According to the method provided in this embodiment of this application, a plurality of different SULs can be configured for one access network device. A same terminal may perform uplink transmission by accessing the different SULs at different time points, and different terminals may also perform uplink transmission on the different SULs at a same time point. After the terminal performs random access on one SUL, the access network device may send configuration information of another SUL to the terminal, and then the terminal performs random access on the other SUL. By configuring a plurality of SULs, an uplink capacity is improved, and performance of a communication system is improved.

With reference to the second aspect, in a first possible implementation of the second aspect, the configuration information of the second SUL is carried in a radio resource control RRC message.

In this embodiment of this application, the access network device may reconfigure an SUL for the terminal by using the RRC message, so that the terminal can work on different SULs, to improve user experience.

With reference to the second aspect or the first possible implementation of the second aspect, in a second possible implementation of the second aspect, the communication unit is further configured to: after initiating the random access on the second SUL, receive configuration information of the first SUL from the access network device, and ignore, by the terminal, the configuration information of the first SUL or store the configuration information of the first SUL.

In this embodiment of this application, after receiving a changed configuration message from the access network device, the terminal considers by default that an activated SUL is still the SUL (that is, the second SUL described in this embodiment of this application) reconfigured by the access network device by using the RRC message, and configuration information of a currently activated SUL is not overwritten, to ensure that the terminal can normally perform uplink transmission on the second SUL.

With reference to any one of the second aspect or the first to the third possible implementations of the second aspect, in a fourth possible implementation of the third aspect, the communication unit is further configured to: before initiating random access on the first SUL, receive N pieces of frequency information of N SULs from the access network device, where the N pieces of frequency information are in a one-to-one correspondence with the N SULs, and the N SULs include the second SUL and the first SUL.

In this embodiment of this application, the access network device may further deliver frequency information of the plurality of SULs configured for the access network device to the terminal, and subsequently may indicate the terminal to switch to another SUL.

With reference to the third possible implementation of the second aspect, in a fourth possible implementation of the second aspect, the configuration information of the second SUL includes the frequency of the second SUL or an index of the second SUL.

In this embodiment of this application, the access network device delivers the frequency information of the plurality of SULs configured for the access network device to the terminal. During subsequent SUL reconfiguration, the frequency information of the SUL may not be delivered, and a frequency of the SUL is indicated by using an index of the SUL.

With reference to the second aspect or the first to the fourth possible implementations of the second aspect, in a fifth possible implementation of the second aspect, the second SUL satisfies one or more of the following conditions: downlink reference signal receive power corresponding to the second SUL is greater than a first threshold, and load of the second SUL is less than a second threshold.

With reference to the second aspect or the first to the fifth possible implementations of the second aspect, in a sixth possible implementation of the second aspect, the communication unit is further configured to: after initiating the random access on the second SUL, disconnect the RRC connection of the first SUL.

According to a third aspect, a communication apparatus is disclosed. The communication apparatus may be a terminal or a chip in the terminal. The communication apparatus may implement the method in the first aspect. The communication apparatus includes: a communication interface, configured to: after establishing an RRC connection to an access network device on a first SUL, receive configuration information of a second SUL from the access network device; and a processor, configured to initiate random access on the second SUL, where a frequency of the second SUL is different from a frequency of the first SUL.

According to the communication apparatus provided in this embodiment of this application, a plurality of different SULs can be configured for one access network device. A same terminal may perform uplink transmission by accessing the different SULs at different time points, and different terminals may also perform uplink transmission on the different SULs at a same time point. After the terminal performs random access on one SUL, the access network device may send configuration information of another SUL to the terminal, and then the terminal performs random access on the other SUL. By configuring a plurality of SULs, an uplink capacity is improved, and performance of a communication system is improved.

With reference to the third aspect, in a first possible implementation of the third aspect, the configuration information of the second SUL is carried in a radio resource control RRC message.

In this embodiment of this application, the access network device may reconfigure an SUL for the terminal by using the RRC message, so that the terminal can work on different SULs, to improve user experience.

With reference to the third aspect or the first possible implementation of the third aspect, in a second possible implementation of the third aspect, the communication interface is further configured to: after initiating the random access on the second SUL, receive configuration information of the first SUL from the access network device, and ignore, by the terminal, the configuration information of the first SUL or store the configuration information of the first SUL.

In this embodiment of this application, after receiving a changed configuration message from the access network device, the terminal considers by default that an activated SUL is still the SUL (that is, the second SUL described in this embodiment of this application) reconfigured by the access network device by using the RRC message, and configuration information of a currently activated SUL is not overwritten, to ensure that the terminal can normally perform uplink transmission on the second SUL.

With reference to any one of the third aspect or the first to the third possible implementations of the third aspect, in a fourth possible implementation of the third aspect, the communication interface is further configured to: before initiating random access on the first SUL, receive N pieces of frequency information of N SULs from the access network device, where the N pieces of frequency information are in a one-to-one correspondence with the N SULs, and the N SULs include the second SUL and the first SUL.

In this embodiment of this application, the access network device may further deliver frequency information of the plurality of SULs configured for the access network device to the terminal, and subsequently may indicate the terminal to switch to another SUL.

With reference to the third possible implementation of the third aspect, in a fourth possible implementation of the third aspect, the configuration information of the second SUL includes the frequency of the second SUL or an index of the second SUL.

In this embodiment of this application, the access network device delivers the frequency information of the plurality of SULs configured for the access network device to the terminal. During subsequent SUL reconfiguration, the frequency information of the SUL may not be delivered, and a frequency of the SUL is indicated by using an index of the SUL.

With reference to the third aspect or the first to the fourth possible implementations of the third aspect, in a fifth possible implementation of the third aspect, the second SUL satisfies one or more of the following conditions: downlink reference signal receive power corresponding to the second SUL is greater than a first threshold, and load of the second SUL is less than a second threshold.

With reference to the third aspect or the first to the fifth possible implementations of the third aspect, in a sixth possible implementation of the third aspect, the communication interface is further configured to: after initiating the random access on the second SUL, disconnect the RRC connection of the first SUL.

According to a fourth aspect, an SUL configuration method is disclosed. The method includes: after establishing an RRC connection to a terminal on a first SUL, sending configuration information of a second SUL to the terminal, where a frequency of the second SUL is different from a frequency of the first SUL; and receiving, by an access network device on the second SUL, a random access request message sent by the terminal.

With reference to the fourth aspect, in a first possible implementation of the fourth aspect, the configuration information of the second SUL is carried in a radio resource control RRC message.

With reference to the fourth aspect or the first possible implementation of the fourth aspect, in a second possible implementation of the fourth aspect, the method further includes: after sending the configuration information of the second SUL to the terminal, sending configuration information of the first SUL to the terminal.

With reference to the fourth aspect or the first or the second possible implementation of the fourth aspect, in a third possible implementation of the fourth aspect, the method further includes: before establishing the RRC connection to the terminal on the first SUL, sending N pieces of frequency information of N SULs to the terminal, where the N pieces of frequency information are in a one-to-one correspondence with the N SULs, and the N SULs include the second SUL and the first SUL.

With reference to the third possible implementation of the fourth aspect, in a fourth possible implementation of the fourth aspect, the configuration information of the second SUL includes the frequency of the second SUL or an index of the second SUL.

With reference to any one of the fourth aspect or the first to the fourth possible implementations of the fourth aspect, in a fifth possible implementation of the fourth aspect, the second SUL satisfies one or more of the following conditions: downlink reference signal receive power corresponding to the second SUL is greater than a first threshold, and load of the second SUL is less than a second threshold.

With reference to the fourth aspect or the first to the fifth possible implementations of the fourth aspect, in a sixth possible implementation of the fourth aspect, after the random access request message is received on the second SUL, the RRC connection of the first SUL is disconnected.

According to a fifth aspect, a communication apparatus is disclosed. The communication apparatus may be an access network device or a chip in the access network device. The method in the fourth aspect may be implemented. The communication apparatus includes: a communication unit, configured to: after establishing an RRC connection to a terminal on a first SUL, send configuration information of a second SUL to the terminal, where a frequency of the second SUL is different from a frequency of the first SUL. The communication unit is further configured to receive, on the second SUL, a random access request message sent by the terminal.

With reference to the fifth aspect, in a first possible implementation of the fifth aspect, the configuration information of the second SUL is carried in a radio resource control RRC message.

With reference to the fifth aspect or the first possible implementation of the fifth aspect, in a second possible implementation of the fifth aspect, the communication unit is further configured to: after sending the configuration information of the second SUL to the terminal, send configuration information of the first SUL to the terminal.

With reference to the fifth aspect or the first or the second possible implementation of the fifth aspect, in a third possible implementation of the fifth aspect, the communication unit is further configured to: before establishing the RRC connection to the terminal on the first SUL, send N pieces of frequency information of N SULs to the terminal, where the N pieces of frequency information are in a one-to-one correspondence with the N SULs, and the N SULs include the second SUL and the first SUL.

With reference to the third possible implementation of the fifth aspect, in a fourth possible implementation of the fifth aspect, the configuration information of the second SUL includes the frequency of the second SUL or an index of the second SUL.

With reference to any one of the fifth aspect or the first to the fourth possible implementations of the fifth aspect, in a fifth possible implementation of the fifth aspect, the second SUL satisfies one or more of the following conditions: downlink reference signal receive power corresponding to the second SUL is greater than a first threshold, and load of the second SUL is less than a second threshold.

With reference to the fifth aspect or the first to the fifth possible implementations of the fifth aspect, in a sixth possible implementation of the fifth aspect, the communication unit is further configured to: after receiving the random access request message on the second SUL, disconnect the RRC connection of the first SUL.

According to a sixth aspect, a communication apparatus is disclosed. The communication apparatus may be an access network device or a chip in the access network device. The method in the fourth aspect may be implemented. The communication apparatus includes a communication interface, configured to: after establishing an RRC connection to a terminal on a first SUL, send configuration information of a second SUL to the terminal, where a frequency of the second SUL is different from a frequency of the first SUL. A random access request message sent by the terminal may be further received on the second SUL through the communication interface.

With reference to the sixth aspect, in a first possible implementation of the sixth aspect, the configuration information of the second SUL is carried in a radio resource control RRC message.

With reference to the sixth aspect or the first possible implementation of the sixth aspect, in a second possible implementation of the sixth aspect, the communication interface is further configured to: after sending the configuration information of the second SUL to the terminal, send configuration information of the first SUL to the terminal.

With reference to the sixth aspect or the first or the second possible implementation of the sixth aspect, in a third possible implementation of the sixth aspect, the communication interface is further configured to: before establishing the RRC connection to the terminal on the first SUL, send N pieces of frequency information of N SULs to the terminal, where the N pieces of frequency information are in a one-to-one correspondence with the N SULs, and the N SULs include the second SUL and the first SUL.

With reference to the third possible implementation of the sixth aspect, in a fourth possible implementation of the sixth aspect, the configuration information of the second SUL includes the frequency of the second SUL or an index of the second SUL.

With reference to any one of the sixth aspect or the first to the fourth possible implementations of the sixth aspect, in a fifth possible implementation of the sixth aspect, the second SUL satisfies one or more of the following conditions: downlink reference signal receive power corresponding to the second SUL is greater than a first threshold, and load of the second SUL is less than a second threshold.

With reference to the sixth aspect or the first to the fifth possible implementations of the sixth aspect, in a sixth possible implementation of the sixth aspect, the communication interface is further configured to: after receiving the random access request message on the second SUL, disconnect the RRC connection of the first SUL.

According to a seventh aspect, an SUL configuration method is disclosed. The method includes: receiving, by a terminal, system information from an access network device, where the system information includes N pieces of first configuration information of N SULs, the N SULs are in a one-to-one correspondence with the N pieces of first configuration information, frequencies of the N SULs are different from each other, and N is an integer greater than or equal to 1; and initiating, by the terminal, random access on a first SUL in the N SULs.

According to the method provided in this embodiment of this application, a plurality of different SULs can be configured for one access network device. A same terminal may perform uplink transmission by accessing the different SULs at different time points, and different terminals may also perform uplink transmission on the different SULs at a same time point. The system information broadcast by the access network device includes configuration information of a plurality of SULs, and the terminal may initiate random access on one SUL in the plurality of SULs. By configuring the plurality of SULs, an uplink capacity is improved, and performance of a communication system is improved.

With reference to the seventh aspect, in a first possible implementation of the seventh aspect, the method further includes: storing the N pieces of first configuration information.

In this embodiment of this application, the terminal can store the first configuration information of the plurality of SULs delivered by the access network device. When subsequently indicating to switch an SUL, the access network device may locally obtain first configuration information of a new SUL.

With reference to the seventh aspect or the first possible implementation of the seventh aspect, in a second possible implementation of the seventh aspect, the method further includes: receiving second configuration information of a second SUL from the access network device, where the second SUL is an SUL different from the first SUL in the N SULs; and performing uplink transmission on the second SUL based on first configuration information of the second SUL and the second configuration information of the second SUL.

In this embodiment of this application, the access network device may further reconfigure an SUL for the terminal, and the terminal may switch to different SULs for uplink transmission, to improve user experience.

With reference to the first possible implementation of the seventh aspect, in a third possible implementation of the seventh aspect, the second configuration information of the second SUL includes a frequency of the second SUL or an index of the second SUL.

With reference to the second or the third possible implementation of the seventh aspect, in a fourth possible implementation of the seventh aspect, the second configuration information of the second SUL is carried in a radio resource control RRC message.

With reference to the seventh aspect or the first to the fourth possible implementations of the seventh aspect, in a fifth possible implementation of the seventh aspect, a priority of the first SUL is higher than that of another SUL in the N SULs, or the first SUL is a default SUL.

With reference to the fifth possible implementation of the seventh aspect, in a sixth possible implementation of the seventh aspect, the method further includes: receiving priorities of the N SULs from the access network device.

With reference to the fifth possible implementation of the seventh aspect, in a seventh possible implementation of the seventh aspect, the method further includes: receiving a priority policy from the access network device, and determining the priorities of the N SULs according to the priority policy, where the priority policy is used to indicate the terminal to determine the priorities of the N SULs based on downlink reference signal received quality corresponding to each of the N SULs.

According to an eighth aspect, a communication apparatus is disclosed. The communication apparatus may be a terminal or a chip in the terminal. The method in the seventh aspect may be implemented. The communication apparatus includes: a communication unit, configured to receive system information from an access network device, where the system information includes N pieces of first configuration information of N SULs, the N SULs are in a one-to-one correspondence with the N pieces of first configuration information, frequencies of the N SULs are different from each other, and N is an integer greater than or equal to 1; and a processing unit, configured to initiate random access on a first SUL in the N SULs.

In this embodiment of this application, a plurality of different SULs can be configured for one access network device. A same terminal may perform uplink transmission by accessing the different SULs at different time points, and different terminals may also perform uplink transmission on the different SULs at a same time point. The system information broadcast by the access network device includes configuration information of a plurality of SULs, and the terminal may initiate random access on one SUL in the plurality of SULs. By configuring the plurality of SULs, an uplink capacity is improved, and performance of a communication system is improved.

With reference to the eighth aspect, in a first possible implementation of the eighth aspect, the processing unit is further configured to store the N pieces of first configuration information.

In this embodiment of this application, the terminal can store first configuration information of the plurality of SULs delivered by the access network device. When subsequently indicating to switch an SUL, the access network device may locally obtain first configuration information of a new SUL.

With reference to the eighth aspect or the first possible implementation of the eighth aspect, in a second possible implementation of the eighth aspect, the communication unit is further configured to: receive second configuration information of a second SUL from the access network device, where the second SUL is an SUL different from the first SUL in the N SULs; and perform uplink transmission on the second SUL based on first configuration information of the second SUL and the second configuration information of the second SUL.

In this embodiment of this application, the access network device may further reconfigure an SUL for the terminal, and the terminal may switch to different SULs for uplink transmission, to improve user experience.

With reference to the first possible implementation of the eighth aspect, in a third possible implementation of the eighth aspect, the second configuration information of the second SUL includes a frequency of the second SUL or an index of the second SUL.

With reference to the second or the third possible implementation of the eighth aspect, in a fourth possible implementation of the eighth aspect, the second configuration information of the second SUL is carried in a radio resource control RRC message.

With reference to the eighth aspect or the first to the fourth possible implementations of the eighth aspect, in a fifth possible implementation of the eighth aspect, a priority of the first SUL is higher than that of another SUL in the N SULs, or the first SUL is a default SUL.

With reference to the fifth possible implementation of the eighth aspect, in a sixth possible implementation of the eighth aspect, the communication unit is further configured to receive priorities of the N SULs from the access network device.

With reference to the fifth possible implementation of the eighth aspect, in a seventh possible implementation of the eighth aspect, the processing unit is further included. The communication unit is further configured to receive a priority policy from the access network device, where the priority policy is used to indicate the terminal to determine the priorities of the N SULs based on downlink reference signal received quality corresponding to each of the N SULs.

The processing unit is configured to determine the priorities of the N SULs according to the priority policy.

According to a ninth aspect, a communication apparatus is disclosed. The communication apparatus may be a terminal or a chip in the terminal. The method in the seventh aspect may be implemented. The communication apparatus includes: a communication interface, configured to receive system information from an access network device, where the system information includes N pieces of first configuration information of N SULs, the N SULs are in a one-to-one correspondence with the N pieces of first configuration information, frequencies of the N SULs are different from each other, and N is an integer greater than or equal to 1; and a processor, configured to initiate random access on a first SUL in the N SULs.

In this embodiment of this application, a plurality of different SULs can be configured for one access network device. A same terminal may perform uplink transmission by accessing the different SULs at different time points, and different terminals may also perform uplink transmission on the different SULs at a same time point. The system information broadcast by the access network device includes configuration information of a plurality of SULs, and the terminal may initiate random access on one SUL in the plurality of SULs. By configuring the plurality of SULs, an uplink capacity is improved, and performance of a communication system is improved.

With reference to the ninth aspect, in a first possible implementation of the ninth aspect, the processor is further configured to store the N pieces of first configuration information.

In this embodiment of this application, the terminal can store first configuration information of the plurality of SULs delivered by the access network device. When subsequently indicating to switch an SUL, the access network device may locally obtain first configuration information of a new SUL.

With reference to the ninth aspect or the first possible implementation of the ninth aspect, in a second possible implementation of the ninth aspect, the communication interface is further configured to: receive second configuration information of a second SUL from the access network device, where the second SUL is an SUL different from the first SUL in the N SULs; and perform uplink transmission on the second SUL based on first configuration information of the second SUL and the second configuration information of the second SUL.

In this embodiment of this application, the access network device may further reconfigure an SUL for the terminal, and the terminal may switch to different SULs for uplink transmission, to improve user experience.

With reference to the first possible implementation of the ninth aspect, in a third possible implementation of the ninth aspect, the second configuration information of the second SUL includes a frequency of the second SUL or an index of the second SUL.

With reference to the second or the third possible implementation of the ninth aspect, in a fourth possible implementation of the ninth aspect, the second configuration information of the second SUL is carried in a radio resource control RRC message.

With reference to the ninth aspect or the first to the fourth possible implementations of the ninth aspect, in a fifth possible implementation of the ninth aspect, a priority of the first SUL is higher than that of another SUL in the N SULs, or the first SUL is a default SUL.

With reference to the fifth possible implementation of the ninth aspect, in a sixth possible implementation of the ninth aspect, the communication interface is further configured to receive priorities of the N SULs from the access network device.

With reference to the fifth possible implementation of the ninth aspect, in a seventh possible implementation of the ninth aspect, the processor is further included. The communication interface is further configured to receive a priority policy from the access network device, where the priority policy is used to indicate the terminal to determine the priorities of the N SULs based on downlink reference signal received quality corresponding to each of the N SULs. The processor is configured to determine the priorities of the N SULs according to the priority policy.

According to a tenth aspect, an SUL configuration method is disclosed. The method includes: broadcasting, by an access network device, system information, where the system information includes N pieces of first configuration information of N SULs, the N SULs are in a one-to-one correspondence with the N pieces of first configuration information, frequencies of the N SULs are different from each other, and N is an integer greater than or equal to 1; and receiving, by the access network device on a first SUL in the N SULs, a random access request message sent by the terminal. The random access request message is used to initiate random access. For example, the random access message may be a Msg1.

With reference to the tenth aspect, in a first possible implementation of the tenth aspect, the method further includes: sending second configuration information of a second SUL to the terminal, where the second SUL is an SUL different from the first SUL in the N SULs.

With reference to the first possible implementation of the tenth aspect, in a second possible implementation of the tenth aspect, the second configuration information of the second SUL includes a frequency of the second SUL or an index of the second SUL.

With reference to the second possible implementation of the tenth aspect, in a third possible implementation of the tenth aspect, the second configuration information of the second SUL is carried in a radio resource control RRC message.

With reference to any one of the tenth aspect or the first to the third possible implementations of the tenth aspect, in a fourth possible implementation of the tenth aspect, a priority of the first SUL is higher than that of another SUL in the N SULs, or the first SUL is a default SUL.

With reference to the fourth possible implementation of the tenth aspect, in a fifth possible implementation of the tenth aspect, the method further includes: sending a priority of each of the N SULs to the terminal.

With reference to the fourth possible implementation of the tenth aspect, in a sixth possible implementation of the tenth aspect, the method further includes: determining the priority of each of the N SULs based on one or more of the following parameters: downlink reference signal received quality corresponding to the SUL and load of the SUL.

With reference to the fourth possible implementation of the tenth aspect, in a seventh possible implementation of the tenth aspect, the method further includes: sending a priority policy to the terminal, where the priority policy is used to indicate the terminal to determine priorities of the N SULs based on downlink reference signal received quality corresponding to each of the N SULs.

According to an eleventh aspect, a communication apparatus is disclosed. The communication apparatus may be an access network device or a chip in the access network device. The method in the tenth aspect may be implemented. The communication apparatus includes: a communication unit, configured to broadcast system information, where the system information includes N pieces of first configuration information of N SULs, the N SULs are in a one-to-one correspondence with the N pieces of first configuration information, frequencies of the N SULs are different from each other, and N is an integer greater than or equal to 1. The communication unit is further configured to receive, on a first SUL in the N SULs, a random access message sent by a terminal. The random access message is used to initiate random access. For example, the random access message may be a Msg1.

With reference to the eleventh aspect, in a first possible implementation of the eleventh aspect, the communication unit is further configured to send second configuration information of a second SUL to the terminal, where the second SUL is an SUL different from the first SUL in the N SULs.

With reference to the first possible implementation of the eleventh aspect, in a second possible implementation of the eleventh aspect, the second configuration information of the second SUL includes a frequency of the second SUL or an index of the second SUL.

With reference to the second possible implementation of the eleventh aspect, in a third possible implementation of the eleventh aspect, the second configuration information of the second SUL is carried in a radio resource control RRC message.

With reference to any one of the eleventh aspect or the first to the third possible implementations of the eleventh aspect, in a fourth possible implementation of the eleventh aspect, a priority of the first SUL is higher than that of another SUL in the N SULs, or the first SUL is a default SUL.

With reference to the fourth possible implementation of the eleventh aspect, in a fifth possible implementation of the eleventh aspect, the communication unit is further configured to send a priority of each of the N SULs to the terminal.

With reference to the fourth possible implementation of the eleventh aspect, in a sixth possible implementation of the eleventh aspect, the communication unit is further configured to determine the priority of each of the N SULs based on one or more of the following parameters: downlink reference signal received quality corresponding to the SUL and load of the SUL.

With reference to the fourth possible implementation of the eleventh aspect, in a seventh possible implementation of the eleventh aspect, the communication unit is further configured to send a priority policy to the terminal, where the priority policy is used to indicate the terminal to determine priorities of the N SULs based on downlink reference signal received quality corresponding to each of the N SULs.

According to a twelfth aspect, a communication apparatus is disclosed. The communication apparatus may be an access network device or a chip in the access network device. The method in the tenth aspect may be implemented. The communication apparatus includes: a communication interface, configured to broadcast system information, where the system information includes N pieces of first configuration information of N SULs, the N SULs are in a one-to-one correspondence with the N pieces of first configuration information, frequencies of the N SULs are different from each other, and N is an integer greater than or equal to 1. The communication interface is further configured to receive, on a first SUL in the N SULs, a random access message sent by a terminal. The random access message is used to initiate random access. For example, the random access message may be a Msg1.

With reference to the twelfth aspect, in a first possible implementation of the twelfth aspect, the communication interface is further configured to send second configuration information of a second SUL to the terminal, where the second SUL is an SUL different from the first SUL in the N SULs.

With reference to the first possible implementation of the twelfth aspect, in a second possible implementation of the twelfth aspect, the second configuration information of the second SUL includes a frequency of the second SUL or an index of the second SUL.

With reference to the second possible implementation of the twelfth aspect, in a third possible implementation of the twelfth aspect, the second configuration information of the second SUL is carried in a radio resource control RRC message.

With reference to any one of the twelfth aspect or the first to the third possible implementations of the twelfth aspect, in a fourth possible implementation of the twelfth aspect, a priority of the first SUL is higher than that of another SUL in the N SULs, or the first SUL is a default SUL.

With reference to the fourth possible implementation of the twelfth aspect, in a fifth possible implementation of the twelfth aspect, the communication interface is further configured to send a priority of each of the N SULs to the terminal.

With reference to the fourth possible implementation of the twelfth aspect, in a sixth possible implementation of the twelfth aspect, the communication interface is further configured to determine the priority of each of the N SULs based on one or more of the following parameters: downlink reference signal received quality corresponding to the SUL and load of the SUL.

With reference to the fourth possible implementation of the twelfth aspect, in a seventh possible implementation of the twelfth aspect, the communication interface is further configured to send a priority policy to the terminal, where the priority policy is used to indicate the terminal to determine priorities of the N SULs based on downlink reference signal received quality corresponding to each of the N SULs.

According to a thirteenth aspect, a communication apparatus is disclosed. The communication apparatus includes a processor. The processor is coupled to a memory, and the memory is configured to store a computer program. The processor is configured to execute the computer program stored in the memory, so that the apparatus performs the method according to any one of the first aspect and the possible implementations of the first aspect, the method according to any one of the fourth aspect and the possible implementations of the fourth aspect, the method according to any one of the seventh aspect and the possible implementations of the seventh aspect, and the method according to any one of the tenth aspect and the possible implementations of the tenth aspect.

According to a fourteenth aspect, a readable storage medium is disclosed. The readable storage medium includes a program or instructions. When the program or the instructions is/are run by a processor, the method according to any one of the first aspect and the possible implementations of the first aspect, the method according to any one of the fourth aspect and the possible implementations of the fourth aspect, the method according to any one of the seventh aspect and the possible implementations of the seventh aspect, and the method according to any one of the tenth aspect and the possible implementations of the tenth aspect are performed.

According to a fifteenth aspect, a computer program product is disclosed. The computer program product includes instructions. When the instructions are run on a computer, the computer is enabled to perform the method according to any one of the first aspect and the possible implementations of the first aspect, the method according to any one of the fourth aspect and the possible implementations of the fourth aspect, the method according to any one of the seventh aspect and the possible implementations of the seventh aspect, and the method according to any one of the tenth aspect and the possible implementations of the tenth aspect.

According to a sixteenth aspect, a wireless communication apparatus is disclosed. The wireless communication apparatus stores instructions. When the wireless communication apparatus runs on the apparatus according to the second aspect, the apparatus according to the third aspect, the apparatus according to the fifth aspect, the apparatus according to the sixth aspect, the apparatus according to the eighth aspect, the apparatus according to the ninth aspect, the apparatus according to the eleventh aspect, and the apparatus according to the twelfth aspect, the apparatuses are enabled to perform the method according to any one of the first aspect and the possible implementations of the first aspect, the method according to any one of the fourth aspect and the possible implementations of the fourth aspect, the method according to any one of the seventh aspect and the possible implementations of the seventh aspect, and the method according to any one of the tenth aspect and the possible implementations of the tenth aspect. The wireless communication apparatus is a chip.

According to a seventeenth aspect, an embodiment of this application provides a chip, where the chip includes a processor and an interface circuit, the interface circuit is coupled to the processor, and the processor is configured to run a computer program or instructions, to implement the method according to any one of the first aspect and the possible implementations of the first aspect, the method according to any one of the fourth aspect and the possible implementations of the fourth aspect, the method according to any one of the seventh aspect and the possible implementations of the seventh aspect, and the method according to any one of the tenth aspect and the possible implementations of the tenth aspect. The interface circuit is configured to communicate with a module other than the chip.

According to an eighteenth aspect, an embodiment of this application provides a communication system, where the communication system includes an access network device and a terminal. For example, the access network device and the terminal in the first aspect to the twelfth aspect are included.

For example, after establishing an RRC connection to the access network device on a first SUL, the terminal receives first configuration information of a second SUL from the access network device. The terminal initiates random access on the second SUL, where a frequency of the second SUL is different from a frequency of the first SUL.

Alternatively, for example, the terminal receives system information from the access network device, where the system information includes N pieces of first configuration information of N SULs, the N SULs are in a one-to-one correspondence with the N pieces of first configuration information, frequencies of the N SULs are different from each other, and N is an integer greater than or equal to 1. The terminal initiates random access on the first SUL in the N SULs.

According to a nineteenth aspect, a PUCCH configuration method is disclosed. The method includes: sending, by an access network device, PUCCH configuration information of a first cell by using the first cell; and sending, by the access network device, PUCCH configuration information of a second cell by using the second cell. The PUCCH configuration information of the first cell is the same as the PUCCH configuration information of the second cell, and a frequency of the first cell is the same as a frequency of the second cell.

In this embodiment of this application, spectrum sharing between a plurality of cells is supported. When configuring the plurality of cells, the access network may configure the plurality of cells as same cells, for example, configure same PUCCH configuration information for the plurality of cells. PUCCHs that are of different cells and that are configured by using the same PUCCH configuration information may be the same, so that PUCCH overheads can be reduced.

With reference to the nineteenth aspect, in a first possible implementation of the nineteenth aspect, the PUCCH configuration information includes at least one of a PUCCH resource set and a frequency hopping ID.

According to a twentieth aspect, a PUCCH configuration method is disclosed. The method includes: obtaining and receiving PUCCH configuration information of a first cell; and obtaining PUCCH configuration information of a second cell.

The PUCCH configuration information of the first cell is the same as the PUCCH configuration information of the second cell, and a frequency of the first cell is the same as a frequency of the second cell.

In this embodiment of this application, spectrum sharing between a plurality of cells is supported. When configuring the plurality of cells, an access network may configure the plurality of cells as same cells, for example, configure same PUCCH configuration information for the plurality of cells. PUCCHs that are of different cells and that are configured by using the same PUCCH configuration information may be the same, so that PUCCH overheads can be reduced.

With reference to the twentieth aspect, in a first possible implementation of the twentieth aspect, the configuration information includes an RB location and a quantity of RBs.

It should be noted that the solutions of the twentieth aspect and the nineteenth aspect may be implemented in combination. To be specific, the access network device first obtains the PUCCH configuration information (denoted as configuration information 1) of the first cell and the PUCCH configuration information (denoted as configuration information 2) of the second cell. Then, specific configurations are performed based on the obtained configuration information, and specific configuration information is sent by using a corresponding cell. In a specific implementation, an actual PUCCH configuration of the first cell depends on the configuration information 1 obtained by the access network device. For example, the PUCCH configuration information that is of the first cell and that is broadcast by the access network device by using the first cell is a subset of the configuration information 1. An actual PUCCH configuration of the second cell depends on the configuration information 2 obtained by the access network device. For example, the PUCCH configuration information that is of the second cell and that is broadcast by the access network device by using the second cell is a subset of the configuration information 2.

DETAILED DESCRIPTION OF ILLUSTRATIVE EMBODIMENTS

The following describes the technical solutions of this application with reference to the accompanying drawings.

Figure 1:
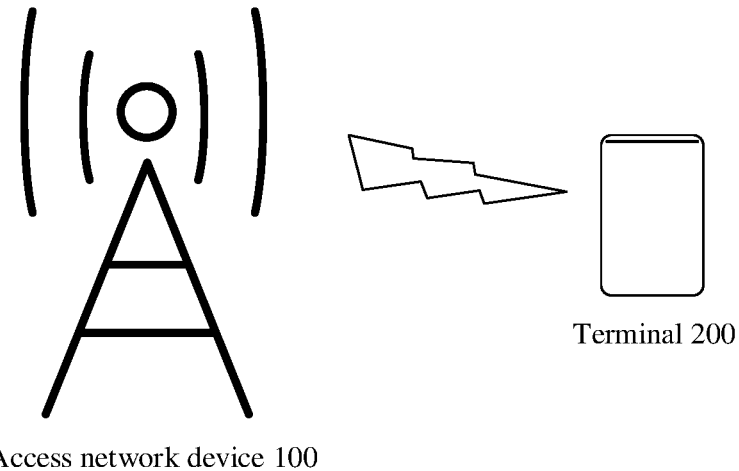
FIG. 1 is a diagram of an architecture of a communication system according to an embodiment of this application.

FIG. 1 is a schematic diagram of a communication system to which technical solutions according to this application are applicable. The communication system may include one or more access network devices 100 and one or more terminals 200 (where FIG. 1 shows only a terminal 200) connected to each of the one or more access network devices 100. FIG. 1 shows an access network device and a terminal. It should be noted that FIG. 1 is merely a schematic diagram, and constitutes no limitation on a scenario to which the technical solutions according to this application are applicable.

The access network device 100 may be a transmission reception point (TRP), a base station, a relay station, a node, an access point, or the like. The access network device 100 may be an access network device in a 5G communication system or an access network device in a future evolved network, or may be a wearable device, a vehicle-mounted device, or the like. Alternatively, the access network device 100 may be a base transceiver station (BTS) in a global system for mobile communication (GSM) or a code division multiple access (CDMA) network, or may be an NB in wideband code division multiple access (WCDMA), or may be an eNB or an eNodeB (evolved NodeB) in long term evolution (LTE). The access network device 100 may alternatively be a radio controller in a cloud radio access network (CRAN) scenario. The following uses a base station as an example for description in this application.

The terminal 200 may be user equipment (UE), an access terminal, a UE unit, a UE station, a mobile station, a mobile station, a remote station, a remote terminal, a mobile device, a UE terminal, a wireless communication device, a UE agent, a UE apparatus, or the like. The access terminal may be a cellular phone, a cordless telephone set, a session initiation protocol (SIP) phone, a wireless local loop (WLL) station, a personal digital assistant (PDA), a handheld device or a computing device that has a wireless communication function, another processing device connected to a wireless modem, a vehicle-mounted device, a wearable device, a terminal in a 5G network, a terminal in a future evolved public land mobile network (PLMN) network, or the like.

Figure 2:
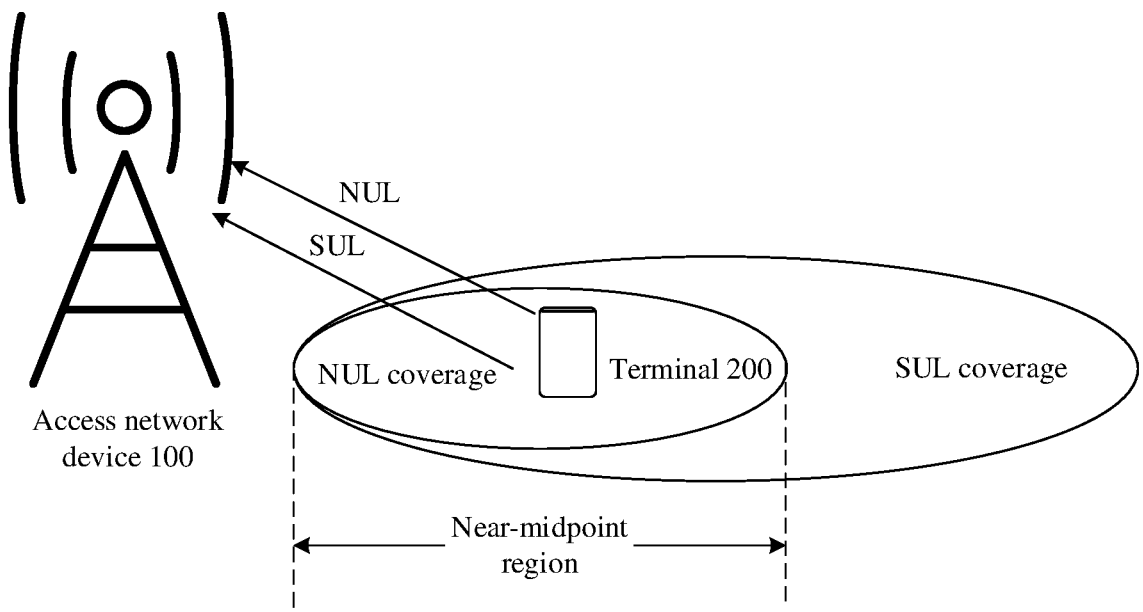
FIG. 2 is a schematic diagram of an SUL scenario according to an embodiment of this application.

The communication system shown in FIG. 1 supports a supplementary uplink (SUL) scenario. FIG. 2 is a schematic diagram of an SUL scenario. As shown in FIG. 2, an access network device 100 may provide two uplink carriers for a terminal 200. The two uplink carriers are a normal uplink (NUL) carrier and a supplementary uplink (SUL) carrier, and transmission may be performed on the NUL and the SUL in a time division multiplexing (TDM) manner. In addition, the SUL may use a frequency band lower than that of the NUL. When a plurality of frequency bands of the SUL are lower than frequency bands of the NUL, coverage of the SUL is larger than coverage of the NUL. As shown in FIG. 2, the terminal 200 may be located in a near-midpoint region of a cell. That the terminal 200 is located in the near-midpoint region may be understood as that the terminal 200 may be located within both the coverage of the NUL and the coverage of the SUL, that the terminal 200 is located within the coverage of the NUL, or that a distance between the terminal 200 and the access network device 100 does not exceed a threshold. The SUL may use a frequency band higher than that of the NUL. This is not limited in this embodiment of this application.

Figure 3:
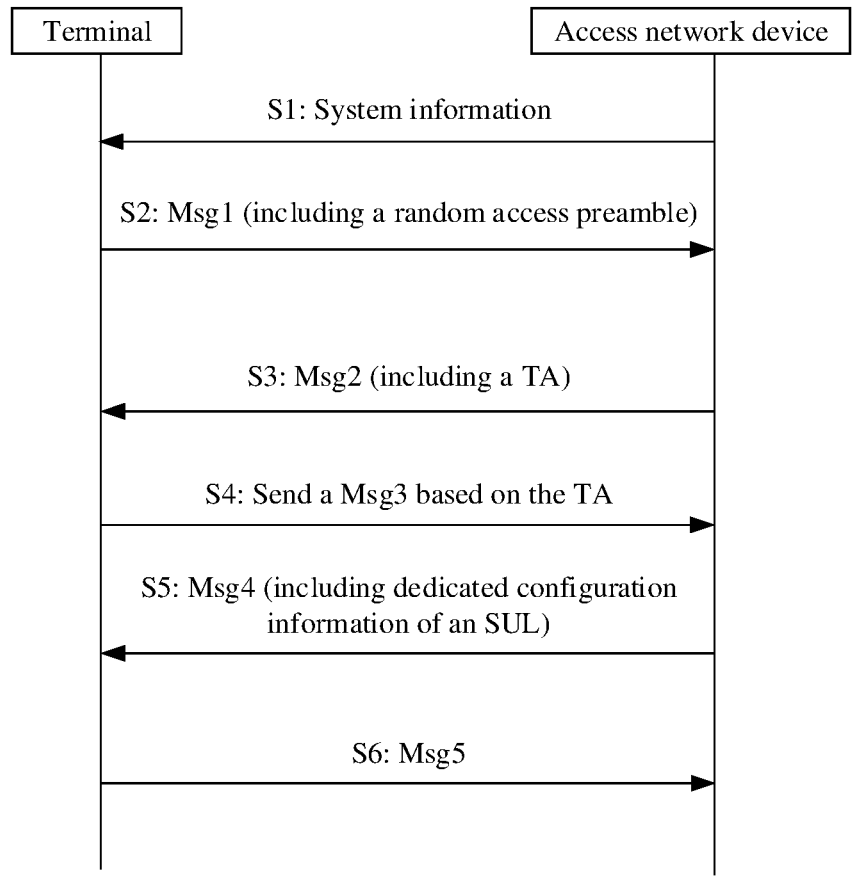
FIG. 3 is a schematic flowchart of random access according to an embodiment of this application.

In a possible implementation, the terminal may access the SUL through a random access procedure shown in FIG. 3. Details are as follows:

S1: The terminal receives system information broadcast by the access network device.

For example, the access network device may broadcast a system information block (SIB), and a terminal in an idle state may monitor the SIB broadcast by the access network device.

In a possible implementation, the system information includes common configuration information (uplink config common SIB) of the SUL. The common configuration information of the SUL includes frequency information, a time alignment timer (TAT), bandwidth part (BWP) initial configuration information, and the like of the SUL. The bandwidth part (BWP) initial configuration information includes basic configuration information of a random access channel (RACH), a physical uplink control channel (PUCCH), and a physical uplink shared channel (PUSCH). A root sequence number in a RACH configuration is used to determine a random access preamble, and physical random access channel (PRACH) time-frequency information is used to indicate a time-frequency resource occupied by a PRACH.

S2: The terminal sends a Msg1 to the access network device through the PRACH, where the Msg1 includes the random access preamble.

The terminal may determine a random access preamble based on the root sequence number, and send the Msg1 on the time-frequency resource indicated by the PRACH time-frequency information in the system information, to initiate random access. In this embodiment of this application, the terminal sends the Msg1 to the access network device, and it is considered that the terminal initiates the random access on the SUL.

S3: The access network device sends a Msg2 to the terminal, where the Msg2 includes an uplink timing advance (TA) calculated by the access network device for the terminal.

The Msg2 may be a random access response (RAR) message.

S4: The terminal determines uplink timing based on the TA, and sends a Msg3 to a base station.

The Msg3 may be first scheduled UL transmission on UL-SCH, namely, data sent by the terminal through the uplink shared channel for the first time.

S5: The access network device sends a Msg4 to the terminal, to indicate a contention result of the random access of the terminal.

The access network device and the terminal may finally complete contention resolution by using the Msg4. In addition, the Msg4 may carry dedicated configuration information of the SUL, and the dedicated configuration information may indicate specific configurations of the physical uplink control channel (PUCCH), the physical uplink shared channel (PUSCH), a sounding reference signal (SRS), and the like of the SUL, for example, configurations of different formats of the PUCCH, configurations of scrambling code, a pilot, and a codebook of the PUSCH, and a configuration of the SRS.

The terminal device may further perform uplink transmission on the SUL based on the common configuration information of the SUL and the dedicated configuration information of the SUL. Optionally, the common configuration information of the SUL and the dedicated configuration information of the SUL may be two pieces of information necessary for the terminal to perform uplink transmission on the SUL. The terminal obtains the common configuration information of the SUL and the dedicated configuration information of the SUL from the access network device, so that the uplink transmission can be performed on the SUL.

The Msg4 may be an RRC establishment message.

S6: The terminal sends a Msg5 to the access network device.

The terminal may further establish an RRC connection to the access network device, and send an RRC establishment complete message to the access network device, for example, the Msg5 in this embodiment of this application.

In this embodiment of this application, the terminal may perform a contention random access process with reference to the procedure shown in FIG. 3. The terminal receives the Msg4 from the access network device, and it is considered that the terminal completes the random access on the SUL. Alternatively, the terminal has sent the Msg5, and it is considered that the terminal completes the random access.

In another possible implementation, the terminal may further access the SUL through a contention-free random access procedure. For example, in the contention-free random access procedure, the terminal sends the Msg1 to the access network device to initiate a random access procedure. The terminal receives the Msg2 from the access network device, and it may be considered that the terminal completes the random access.

The foregoing describes a random access process of the terminal in the idle state with reference to steps S1 to S6. In a possible implementation, the terminal in a connected state may receive a radio resource control (RRC) message from the access network device. ReconfigurationWithSync information in the RRC message may carry the common configuration information of the SUL. After receiving the ReconfigurationWithSync information from the access network device, the terminal in the connected state needs to re-initiate random access. A random access procedure may be the same as the foregoing steps S1 to S5.

Figure 4:
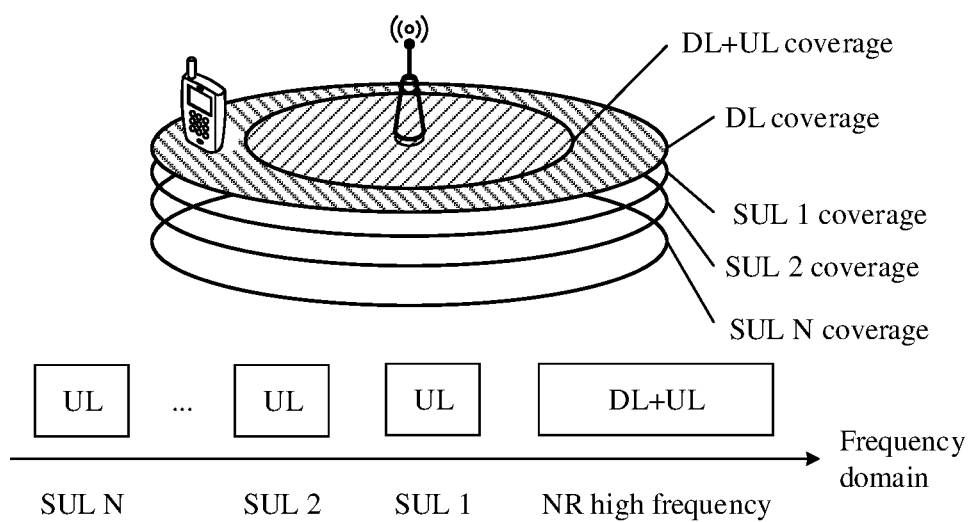
FIG. 4 is another schematic diagram of an SUL scenario according to an embodiment of this application.
Figure 5:
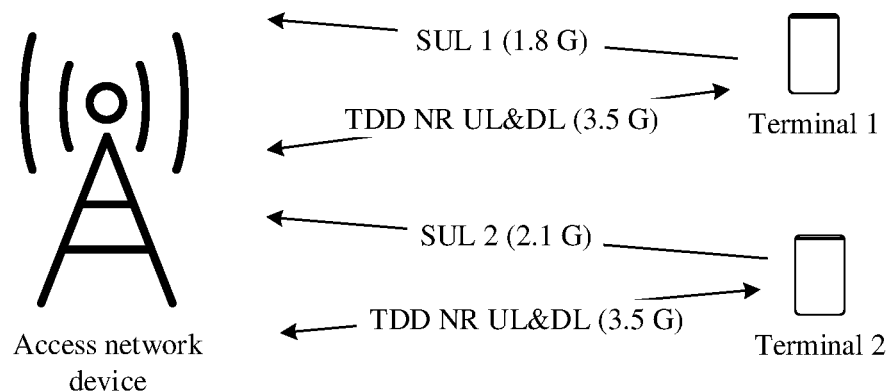
FIG. 5 is another schematic diagram of an SUL scenario according to an embodiment of this application.

In the scenario shown in FIG. 2, one SUL is configured for one access network device. This cannot satisfy capacity requirements of cell users and affects user experience. Refer to FIG. 4. According to the method provided in this embodiment of this application, a plurality of SULs may be configured for an access network device, and the access network device supports the plurality of SULs. Only one SUL is supported for a single terminal. Different SULs may be configured for different terminals. For example, refer to FIG. 5. A terminal 1 performs uplink transmission with the access network device on an SUL 1 (a 1.8 GHz uplink carrier), and a terminal 2 performs uplink transmission with the access network device on an SUL 2 (a 2.1 GHz uplink carrier).

According to the method provided in this embodiment of this application, a plurality of different SULs can be configured for one access network device. A same terminal may perform uplink transmission by accessing the different SULs at different time points, and different terminals may also perform uplink transmission on the different SULs at a same time point. Specifically, the solution provided in this embodiment of this application includes a solution 1 and a solution 2. In the solution 1, after the terminal performs random access on one SUL, the access network device may send configuration information of another SUL to the terminal, and then the terminal performs random access on the another SUL. In the solution 2, system information broadcast by the access network device includes configuration information of a plurality of SULs, and the terminal may initiate random access on one of the plurality of SULs. By configuring the plurality of SULs, an uplink capacity is improved, and performance of a communication system is improved.

Figure 6A:
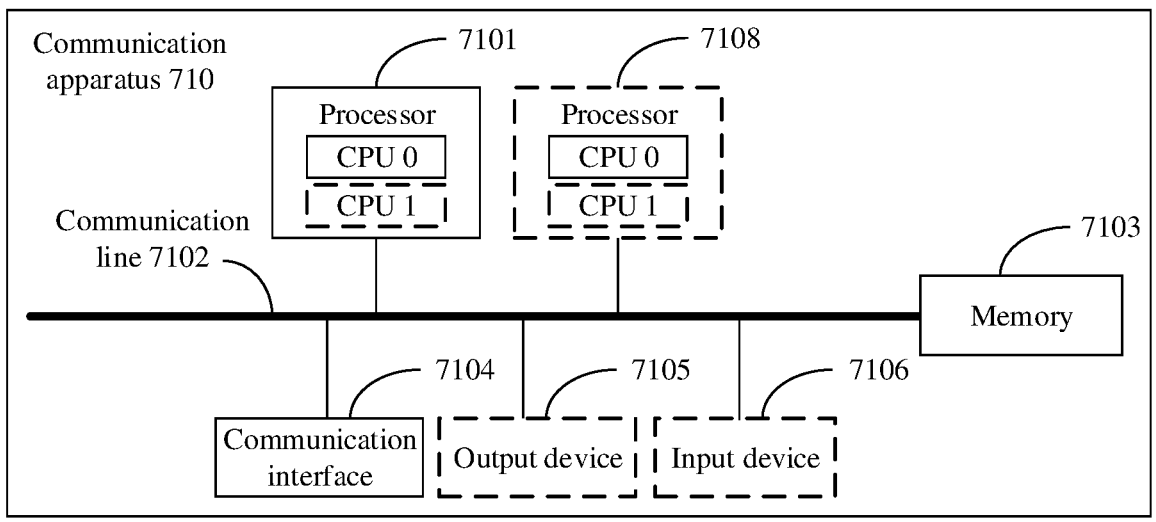
FIG. 6A is a block diagram of a structure of a communication apparatus according to an embodiment of this application.

The terminal in this embodiment of this application may be implemented by using a communication apparatus 710 in FIG. 6A. FIG. 6A is a schematic diagram of a hardware structure of the communication apparatus 710 according to an embodiment of this application. The communication apparatus 710 includes a processor 7101, a communication line 7102, a memory 7103, and at least one communication interface (where descriptions are provided in FIG. 6A merely by using an example in which the communication apparatus 710 includes the communication interface 7104).

The processor 7101 may be a general-purpose central processing unit (CPU), a microprocessor, an application-specific integrated circuit (ASIC), or one or more integrated circuits for controlling program execution of the solutions in this application.

The communication line 7102 may include a path for transmitting information between the foregoing components.

The communication interface 7104 uses any apparatus such as a transceiver, to communicate with another device or a communication network, for example, the Ethernet, a radio access network (RAN), or a wireless local area network (WLAN).

The memory 7103 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or another compact disc storage, optical disc storage (including a compressed optical disc, a laser disc, an optical disc, a digital versatile optical disc, a Blue-ray optical disc, or the like), a magnetic disk storage medium or another magnetic storage device, or any other medium that can be configured to carry or store expected program code in a form of instructions or a data structure and that can be accessed by a computer, but is not limited thereto. The memory may exist independently, and is connected to the processor through the communication line 7102. The memory may alternatively be integrated with the processor.

The memory 7103 is configured to store computer-executable instructions for executing the solutions of this application, and the processor 7101 controls the execution. The processor 7101 is configured to execute the computer-executable instructions stored in the memory 7103, to implement the intent processing method provided in the following embodiments of this application.

Optionally, the computer-executable instructions in the embodiments of this application may also be referred to as application program code. This is not specifically limited in the embodiments of this application.

During specific implementation, in an embodiment, the processor 7101 may include one or more CPUs, for example, a CPU 0 and a CPU 1 in FIG. 6A.

During specific implementation, in an embodiment, the communication apparatus 710 may include a plurality of processors, for example, the processor 7101 and a processor 7108 in FIG. 6A. Each of the processors may be a single-core (single-CPU) processor, or may be a multi-core (multi-CPU) processor. Herein the processor may be one or more devices, circuits, and/or processing cores configured to process data (for example, computer program instructions).

During specific implementation, in an embodiment, the communication apparatus 710 may further include an output device 7105 and an input device 7106. The output device 7105 communicates with the processor 7101, and may display information in a plurality of manners. For example, the output device 7105 may be a liquid crystal display (LCD), a light emitting diode (LED) display device, a cathode ray tube (CRT) display device, or a projector. The input device 7106 communicates with the processor 7101, and may receive an input of a user in a plurality of manners. For example, the input device 7106 may be a mouse, a keyboard, a touchscreen device, or a sensing device.

The foregoing communication apparatus 710 may be a general-purpose device or a special-purpose device. During specific implementation, the communication apparatus 710 may be a desktop computer, a portable computer, a network server, a palmtop computer (PDA), a mobile phone, a tablet computer, a wireless terminal apparatus, an embedded device, or a device having a structure similar to that in FIG.

6A. A type of the communication apparatus 710 is not limited in this embodiment of this application.

Figure 6B:
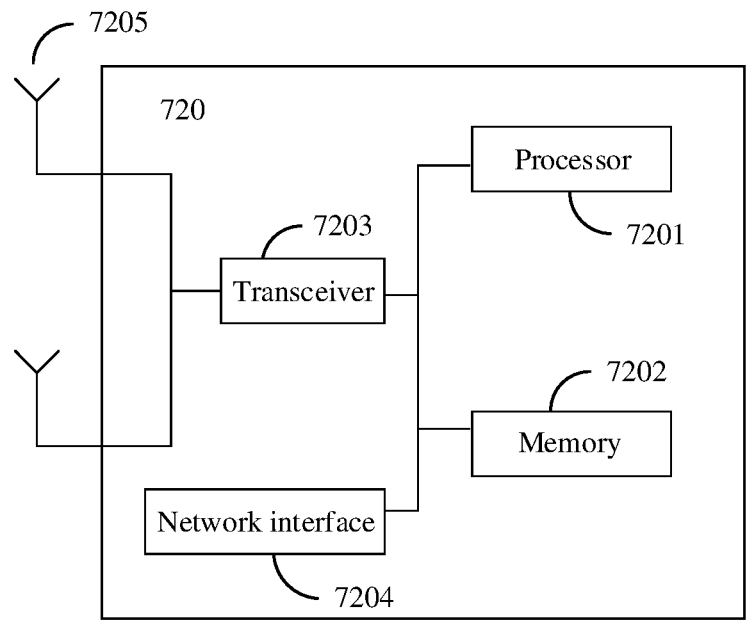
FIG. 6B is another block diagram of a structure of a communication apparatus according to an embodiment of this application.

FIG. 6B is a schematic diagram of a structure of an access network device. For a structure of the access network device 720, refer to the structure shown in FIG. 6B.

The access network device includes at least one processor 7201, at least one memory 7202, at least one transceiver 7203, at least one network interface 7204, and one or more antennas 7205. The processor 7201, the memory 7202, the transceiver 7203, and the network interface 7204 are connected, for example, connected through a bus. The antenna 7205 is connected to the transceiver 7203. The network interface 7204 is configured to connect the access network device and another communication device through a communication link. For example, the access network device is connected to a core network element through an S1 interface. In this embodiment of this application, the connections may include various types of interfaces, transmission lines, buses, or the like. This is not limited in this embodiment.

In this embodiment of this application, the processor such as the processor 7201 may include at least one of the following types: a general-purpose central processing unit (CPU), a digital signal processor (DSP), a microprocessor, an application-specific integrated circuit (ASIC), a microcontroller unit (MCU), a field programmable gate array (FPGA), or an integrated circuit configured to implement a logical operation. For example, the processor 7201 may be a single-core (single-CPU) processor or a multi-core (multi-CPU) processor. The at least one processor 7201 may be integrated into one chip or located on a plurality of different chips.

In this embodiment of this application, the memory such as the memory 7202 may include at least one of the following types: a read-only memory (ROM), another type of static storage device capable of storing static information and instructions, a random access memory (RAM), or another type of dynamic storage device capable of storing information and instructions, or may be an electrically erasable programmable read-only memory (EPROM). In some scenarios, the memory may alternatively be a compact disc read-only memory (CD-ROM), another compact disc storage, optical disc storage (including a compact disc, a laser disc, an optical disc, a digital versatile disc, a Blu-ray disc, and the like), a magnetic disk storage medium, another magnetic storage device, or any other medium that can be configured to carry or store expected program code in a form of instructions or a data structure and that can be accessed by a computer, but is not limited thereto.

The memory 7202 may exist independently, and is connected to the processor 7201. Optionally, the memory 7202 and the processor 7201 may alternatively be integrated, for example, integrated into a chip. The memory 7202 can store program code for performing the technical solutions in the embodiments of this application, and the processor 7201 controls execution of the program code. Various types of executed computer program code may also be considered as drivers of the processor 7201. For example, the processor 7201 is configured to execute the computer program code stored in the memory 7202, to implement the technical solutions in the embodiments of this application.

The transceiver 7203 may be configured to support receiving or sending of a radio frequency signal between the access network device and a terminal, and the transceiver 7203 may be connected to the antenna 7205. Specifically, the one or more antennas 7205 may receive a radio frequency signal. The transceiver 7203 may be configured to: receive the radio frequency signal from the antenna, convert the radio frequency signal into a digital baseband signal or a digital intermediate frequency signal, and provide the digital baseband signal or the digital intermediate frequency signal for the processor 7201, so that the processor 7201 further processes the digital baseband signal or the digital intermediate frequency signal, for example, performs demodulation processing and decoding processing. In addition, the transceiver 7203 may be configured to: receive a modulated digital baseband signal or digital intermediate frequency signal from the processor 7201, convert the modulated digital baseband signal or digital intermediate frequency signal into a radio frequency signal, and send the radio frequency signal through the one or more antennas 7205. Specifically, the transceiver 7203 may selectively perform one or more levels of frequency down-mixing processing and analog-to-digital conversion processing on the radio frequency signal to obtain the digital baseband signal or the digital intermediate frequency signal. A sequence of the frequency down-mixing processing and the analog-to-digital conversion processing is adjustable. The transceiver 7203 may selectively perform one or more levels of frequency up-mixing processing and digital-to-analog conversion processing on the modulated digital baseband signal or digital intermediate frequency signal to obtain the radio frequency signal. A sequence of the frequency up-mixing processing and the digital-to-analog conversion processing is adjustable. The digital baseband signal and the digital intermediate frequency signal may be collectively referred to as a digital signal. The transceiver may be referred to as a transceiver circuit, a transceiver unit, a transceiver component, a sending circuit, a sending unit, a sending component, or the like.

Figure 7:
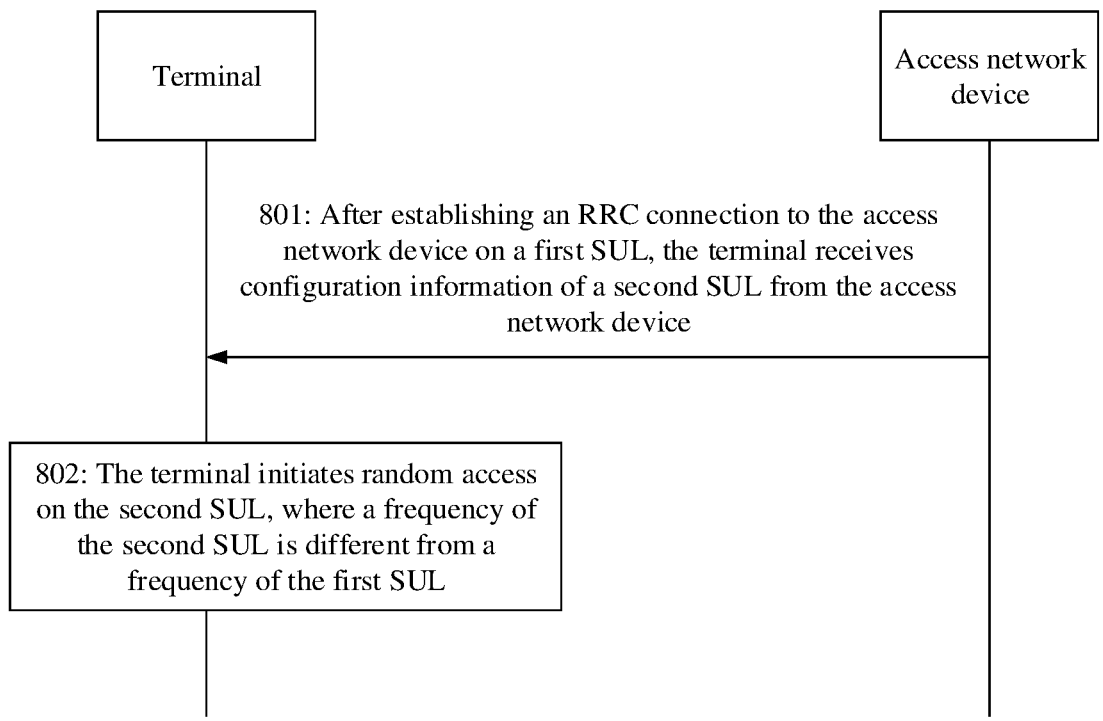
FIG. 7 is a schematic flowchart of an SUL configuration method according to an embodiment of this application.

An embodiment of this application provides an SUL configuration method. As shown in FIG. 7, the method includes the following steps.

801: After establishing an RRC connection to an access network device on a first SUL, a terminal receives configuration information of a second SUL from the access network device.

It should be noted that a scenario in which the terminal establishes the RRC connection to the access network device on the first SUL is not limited in this embodiment of this application. There may be a plurality of scenarios in which the RRC connection is established. For example, the terminal may complete random access on the first SUL. For example, the terminal receives a Msg4 from the access network device, or the terminal has sent a Msg5. That the terminal establishes the RRC connection to the access network device on the first SUL may also be that the terminal re-establishes the RRC connection to the access network device after completing the random access.

In addition, that the terminal receives first configuration information of the second SUL from the access network device after establishing the RRC connection to the access network device on the first SUL may be considered that the terminal receives the first configuration information of the second SUL at any moment (for example, immediately or after a period of time) after establishing the RRC connection.

It may be understood that after establishing the RRC connection to the access network device on the first SUL, the terminal is in a connected state, and may receive the configuration information of the second SUL from the access network device. The configuration information of the second SUL may be common configuration information of the second SUL.

Optionally, after receiving common configuration information and dedicated configuration information of an SUL from the access network device, the terminal may perform uplink transmission on the SUL based on the common configuration information and the dedicated configuration information of the SUL.

In a specific implementation, when the terminal is in an idle state, the terminal receives system information 1 broadcast by the access network device, where the system information 1 carries common configuration information of the first SUL. For example, the common configuration information of the first SUL includes frequency, TAT, and BWP information of the first SUL.

The terminal may further initiate the random access on the first SUL based on the system information 1, then receive the Msg4 from the access network device, and obtain dedicated configuration information of the first SUL from the Msg4. The terminal may perform uplink transmission on the first SUL based on the common configuration information of the first SUL and the dedicated configuration information of the first SUL.

It should be noted that a frequency of an SUL may be used to distinguish between different SULs, and frequencies of different SULs are different from each other. For example, a frequency of one SUL is 1.8 GHz, and a frequency of another SUL is 2.1 GHz. The frequencies of the two SULs are different. The second SUL and the first SUL in this embodiment of this application have different frequencies, and are different SULs.

After establishing the RRC connection to the access network device on the first SUL, the terminal enters the connected state, and may receive the common configuration information of the second SUL from the access network device. The common configuration information of the second SUL may indicate the terminal device to switch to the second SUL different from the first SUL, or may indicate the terminal to initiate random access on the second SUL.

For example, the access network device includes the common configuration information of the second SUL in an RRC message and sends the RRC message to the terminal. The common configuration information of the second SUL may be the common configuration information of the second SUL. Specifically, the terminal receives the RRC message from the access network device, where the RRC message carries ReconfigurationWithSync information, and the ReconfigurationWithSync information includes the common configuration information of the second SUL.

802: The terminal initiates the random access on the second SUL.

The terminal receives the ReconfigurationWithSync information, and obtains the common configuration information of the second SUL. After receiving the ReconfigurationWithSync information, the terminal may initiate the random access again, that is, the terminal may initiate the random access on the second SUL.

Subsequently, the terminal may further receive dedicated configuration information of the second SUL from the access network device, that is, the dedicated configuration information of the second SUL, and perform uplink transmission on the second SUL based on the common configuration information of the second SUL and the dedicated configuration information of the second SUL.

That the terminal initiates the random access on the second SUL may be understood as that the terminal sends a random access request message on the second SUL, and correspondingly, the access network device receives the random access request message on the second SUL. In a possible implementation, the random access request message may be a Msg1.

Optionally, the method shown in FIG. 7 further includes: After initiating the random access on the second SUL, the terminal receives the common configuration information of the first SUL from the access network device, and the terminal ignores the common configuration information of the first SUL or stores the common configuration information of the first SUL.

Specifically, when the terminal receives a system information change indication or a system information timer expires, the terminal actively monitors system information broadcast by the access network device. If the terminal obtains common configuration information (for example, a frequency) of an SUL from the system information, the terminal compares the common configuration information of the SUL with common configuration information of a currently activated SUL (that is, an SUL reconfigured by the access network device for the terminal by using the RRC message, for example, the second SUL described in this embodiment of this application). If the obtained common configuration information of the SUL is inconsistent with the common configuration information of the currently activated SUL, the terminal ignores the obtained common configuration information of the SUL, or stores the obtained common configuration information of the SUL, but still considers by default that the currently activated SUL is a valid SUL, and performs uplink transmission on the currently activated SUL.

It should be noted that the system information change indication is used to notify the terminal that the system information is to change. After receiving the system information change indication, the terminal in the connected state may actively receive the system information broadcast by the access network device. The terminal does not actively receive the system information broadcast by the access network device within a validity period of the system information timer. After the system information timer expires, the terminal in the connected state may actively receive the system information broadcast by the access network device.

In this embodiment of this application, after switching the SUL, the terminal identifies new common configuration information from the system information, and does not directly overwrite the common configuration information of the currently activated SUL with the new common configuration information, so that a problem that the terminal cannot normally perform uplink transmission on the SUL because of inconsistency between the configuration information and the activated SUL is avoided.

In a possible implementation, a plurality of different SULs may be configured for the access network device. For example, N SULs are configured for the access network device, and the N SULs include the first SUL and the second SUL.

Optionally, after the terminal establishes the RRC connection to the access network device on the first SUL, the access network device may reconfigure an SUL for the terminal, and indicate the terminal to switch to the reconfigured SUL, for example, the second SUL in this embodiment of this application.

Specifically, the SUL reconfigured for the terminal may be determined in the N SULs in the following three manners.

In the first manner, the reconfigured SUL is determined based on downlink reference signal received quality corresponding to the SUL.

The terminal may measure a downlink reference signal sent by the access network device, and report a measurement result (for example, the downlink reference signal received quality) to the access network device. The access network device may reconfigure, for the terminal, an SUL whose measurement result is greater than a first threshold.

For example, an SUL that has the highest downlink reference signal received power is reconfigured for the terminal.

In a possible implementation, an LTE cell may be supported on a downlink spectrum of an FDD spectrum in which the SUL is located, and the terminal may obtain, through measurement, signal strength of an FDD downlink spectrum corresponding to the SUL. The downlink reference signal received quality corresponding to the SUL may be the signal strength of the FDD downlink spectrum corresponding to the SUL.

In the second manner, the reconfigured SUL is determined based on load of the SUL.

The access network device may reconfigure, for the terminal, an SUL whose load is less than a second threshold. In a possible implementation, the load of the SUL may be determined based on resource block (RB) utilization of the SUL, and lower RB utilization of the SUL indicates lower load of the SUL.

For example, the access network device may indicate the terminal to switch to an SUL that has the lowest load. For example, the second SUL is an SUL that has the lowest load in the N SULs.

In the third manner, the reconfigured SUL is determined based on downlink reference signal received quality corresponding to the SUL and load of the SUL.

For example, the access network device may determine a weight coefficient of the downlink reference signal received quality and a weight coefficient of the load of the SUL, determine a score of each SUL based on the weight coefficient of the downlink reference signal received quality and the weight coefficient of the load of the SUL, and reconfigure, for the terminal, an SUL whose score is greater than a third threshold.

For example, a score of the SUL is $a \times X + b \times Y$, where a is the weight coefficient of the downlink reference signal received quality, X is the downlink reference signal received quality, b is the weight coefficient of the load of the SUL, and Y is the load of the SUL.

In a possible implementation, the access network device sends common configuration information of the reconfigured SUL to the terminal by using the RRC message. For example, the access network device sends the configuration information of the second SUL (for example, the common configuration information of the second SUL) to the terminal, and the configuration information of the second SUL may be carried in the RRC message.

Optionally, before initiating the random access on the first SUL, the terminal may further receive N pieces of frequency information of the N SULs from the access network device. The N pieces of frequency information are in a one-to-one correspondence with the N SULs, and the N SULs include the second SUL and the first SUL. The terminal may store the N pieces of frequency information.

Specifically, when configuring the first SUL by using the system information, the access network device may simultaneously include the N pieces of frequency information of the N SULs and the common configuration information of the first SUL. For example, the system information 1 in this embodiment of this application carries the N pieces of frequency information and the common configuration information of the first SUL.

Optionally, the system information may further carry indexes of N frequencies indicated by the N pieces of frequency information. The terminal subsequently receives an index from the access network device, and may determine a frequency and an SUL corresponding to the frequency. Alternatively, the system information may not carry indexes of N frequencies, and the indexes of the N frequencies are in a default sequence. For example, $\log_2 N$ bits may be used to indicate the indexes of the N frequencies. For example, four frequencies may be indicated by using two bits. "00", "01", "10", and "11" indicate different indexes.

Optionally, because the access network device configures the N pieces of frequency information of the N SULs for the terminal in advance, when subsequently indicating the common configuration information of the second SUL, the access network device may include a frequency of the second SUL, or may include an index of the second SUL. The terminal may find the frequency of the second SUL or the index of the second SUL in the locally stored N pieces of frequency information.

Correspondingly, after establishing the RRC connection to the terminal on the first SUL, the access network device sends the configuration information of the second SUL to the terminal, where the frequency of the second SUL is different from a frequency of the first SUL.

The access network device may further receive the random access request message from the terminal on the second SUL.

In a possible implementation, the random access request message may be the Msg1.

In this embodiment of this application, the access network device may configure the plurality of different SULs, and may further indicate the terminal to switch to different SULs. Different terminals may perform uplink transmission on different SULs. This greatly increases a capacity in the SUL, and improves performance of a communication system. In addition, an appropriate SUL may be selected for the terminal based on a situation of each terminal, to improve terminal experience.

Figure 8:
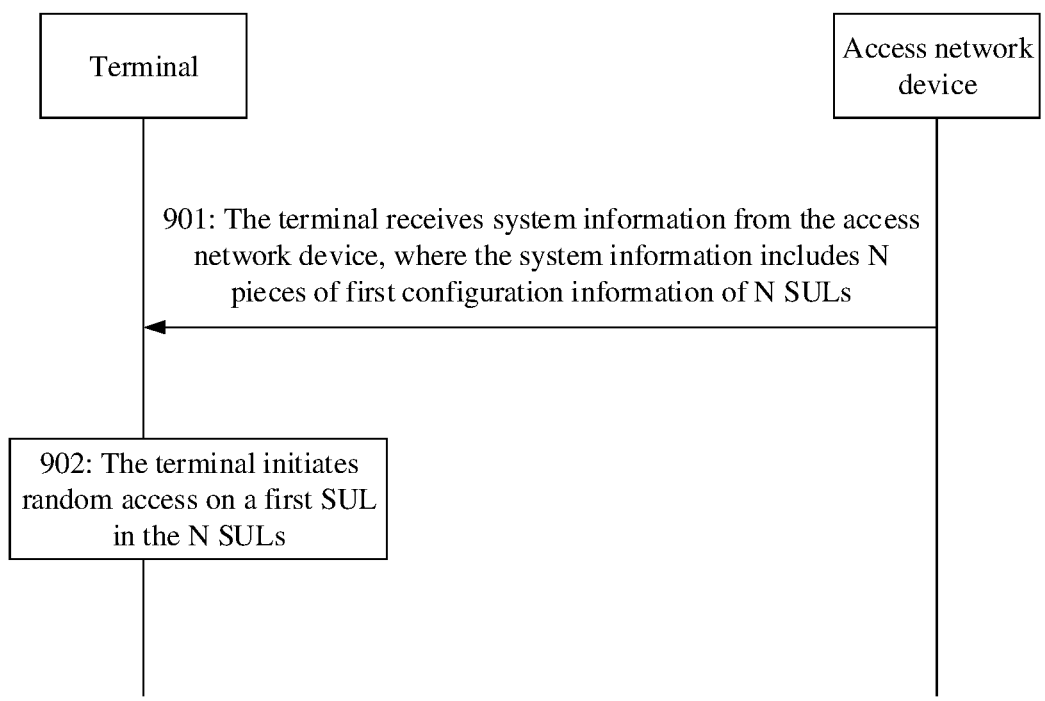
FIG. 8 is another schematic flowchart of an SUL configuration method according to an embodiment of this application.

An embodiment of this application further provides an SUL configuration method. Refer to FIG. 8. The method includes the following steps.

901: A terminal receives system information from an access network device, where the system information includes N pieces of first configuration information of N SULs, the N SULs are in a one-to-one correspondence with the N pieces of first configuration information, and frequencies of the N SULs are different from each other.

In this embodiment of this application, the access network device may configure a plurality of different SULs, and the terminal may perform uplink transmission on one of the SULs. For example, the access network device configures N SULs, and frequencies of the N SULs are different from each other.

In a possible implementation, first configuration information of a first SUL may be common configuration information of the SUL. For example, the first configuration information of the first SUL includes frequency, TAT, and BWP information of the first SUL.

902: The terminal initiates random access on the first SUL in the N SULs.

Correspondingly, the access network device may receive a random access request message from the terminal on the first SUL in the N SULs. In a possible implementation, the random access request message may be a Msg1.

It should be noted that after receiving the first configuration information of the N SULs from the access network device, the terminal may initiate random access on one of the N SULs. For example, random access is initiated on an SUL that has a highest priority, that is, a priority of the first SUL is higher than that of another SUL in the N SULs. Alternatively, random access is initiated on a default SUL, that is, the first SUL is the default SUL in the N SULs. The pre-configuration herein may be understood as that the terminal and the access network device consider by default that the terminal initiates random access on an SUL in the N SULs, for example, the $1^{st}$ SUL in the N SULs.

In a possible implementation, the access network device may determine a priority of each of the N SULs, and send the priority of each of the N SULs to the terminal, so that the terminal can initiate random access on the SUL that has the highest priority in the N SULs. Specifically, the terminal may determine the priority of each of the N SULs in the following three manners.

In the first manner, the priority of the SUL is determined based on downlink reference signal received quality corresponding to the SUL.

The terminal may measure a downlink reference signal sent by the access network device. A higher downlink measurement result (for example, downlink reference signal received quality) indicates a higher priority of the SUL.

It should be noted that an LTE cell may be supported on a downlink spectrum of an FDD spectrum in which the SUL is located, and the terminal may obtain, through measurement, signal strength of an FDD downlink spectrum corresponding to the SUL. The downlink reference signal received quality corresponding to the SUL may be the signal strength of the FDD downlink spectrum corresponding to the SUL.

In the second manner, the priority of the SUL is determined based on load of the SUL.

For example, an SUL that has lower load has a highest priority.

In a possible implementation, the load of the SUL may be determined based on resource block (RB) utilization of the SUL, and lower RB utilization of the SUL indicates lower load of the SUL.

In the third manner, the priority of the SUL is determined based on downlink reference signal received quality corresponding to the SUL and load of the SUL.

For example, the access network device may determine a weight coefficient of the downlink reference signal received quality and a weight coefficient of the load of the SUL, determine a score of each SUL based on the weight coefficient of the downlink reference signal received quality and the weight coefficient of the load of the SUL. A higher score of the SUL indicates a higher priority of the SUL.

In a possible implementation, the access network device may further send a priority policy to the terminal, and the terminal receives the priority policy from the access network device, and may determine the priority of each of the N SULs based on the priority policy. For example, the priority policy is used to indicate the terminal to determine the priorities of the N SULs based on downlink reference signal received quality corresponding to each of the N SULs.

The downlink reference signal received quality corresponding to the SUL may be the signal strength of the FDD downlink spectrum corresponding to the SUL.

In a possible implementation, the terminal initiates random access on a specified SUL in the N SULs by default, and the first SUL is the default SUL. For example, random access is initiated on the $1^{st}$ SUL in the N SULs, where the first SUL is the $1^{st}$ SUL in the N SULs.

It may be understood that the $1^{st}$ SUL in the N SULs may be an SUL corresponding to the $1^{st}$ first configuration information in the system information.

In a possible implementation, the terminal receives indication information from the access network device, and initiates random access on an SUL in the N SULs based on the indication information, where the first SUL is an SUL indicated by the indication information. For example, the indication information may be an identifier of the SUL, or may be an index of the SUL.

Optionally, the method shown in FIG. 8 further includes: The terminal stores the N pieces of first configuration information. In a subsequent process, after obtaining second configuration information of an SUL, the terminal may switch to the SUL based on the first configuration information and the second configuration information of the SUL, to perform uplink transmission.

In a possible implementation, after the terminal initiates the random access in step 902, the terminal may receive a Msg4 from the access network device, to complete the random access. The terminal may further obtain second configuration information of the first SUL from the Msg4, where the second configuration information of the first SUL may be dedicated configuration information of the first SUL.

The terminal may further access the first SUL based on the first configuration information of the first SUL and the second configuration information of the first SUL, and perform uplink transmission on the first SUL.

Optionally, the method shown in FIG. 8 further includes: After establishing an RRC connection to the access network device on the first SUL, the terminal enters a connected state, and may receive an RRC message from the access network device. The access network device may indicate, by using the RRC message, the terminal to switch to another SUL, for example, a second SUL described in this embodiment of this application, and the second SUL is an SUL different from the first SUL in the N SULs.

Specifically, because the terminal stores the first configuration information of the N SULs, the access network delivers second configuration information of the second SUL, the terminal may obtain the second configuration information of the second SUL and first configuration information of the second SUL. For example, the access network device may deliver the second configuration information of the second SUL by using the RRC message. Optionally, the access network device may actively deliver the second configuration information of the second SUL, and the terminal does not need to initiate random access. The Msg4 carries the second configuration information of the second SUL.

Correspondingly, the terminal receives the second configuration information of the second SUL from the access network device.

The terminal may further perform uplink transmission on the second SUL based on the first configuration information of the second SUL and the second configuration information of the second SUL. The terminal may not need to initiate random access on the second SUL, and may perform uplink transmission based on the first configuration information of the second SUL and the second configuration information of the second SUL, so that a random access procedure is avoided and a latency is reduced.

In a possible implementation, when receiving the second configuration information of the second SUL, the terminal may further receive a frequency of the second SUL or an index of the second SUL from the access network device. The terminal may determine, based on the frequency of the second SUL or the index of the second SUL, an SUL corresponding to the received second configuration information. For example, the received second configuration information is dedicated 1, and the received frequency is 1.8 GHz. In this case, the terminal may determine that the received dedicated 1 is dedicated configuration information of a 1.8 GHz SUL.

Specifically, the access network device may include the frequency (or the index) of the second SUL and the second configuration information of the second SUL in one message for delivery. Alternatively, the access network device may deliver the frequency (or the index) of the second SUL and the second configuration information of the second SUL by using different messages. For example, the second configuration information of the second SUL and the frequency (or the index) of the second SUL are carried in different RRC messages. Alternatively, the second configuration information of the second SUL may further include a frequency (or an index) of the second SUL. For example, the second configuration information of the second SUL is dedicated configuration information of the second SUL, and a field may be added to the dedicated configuration information of the second SUL to indicate the frequency (or the index) of the second SUL.

Figure 9:
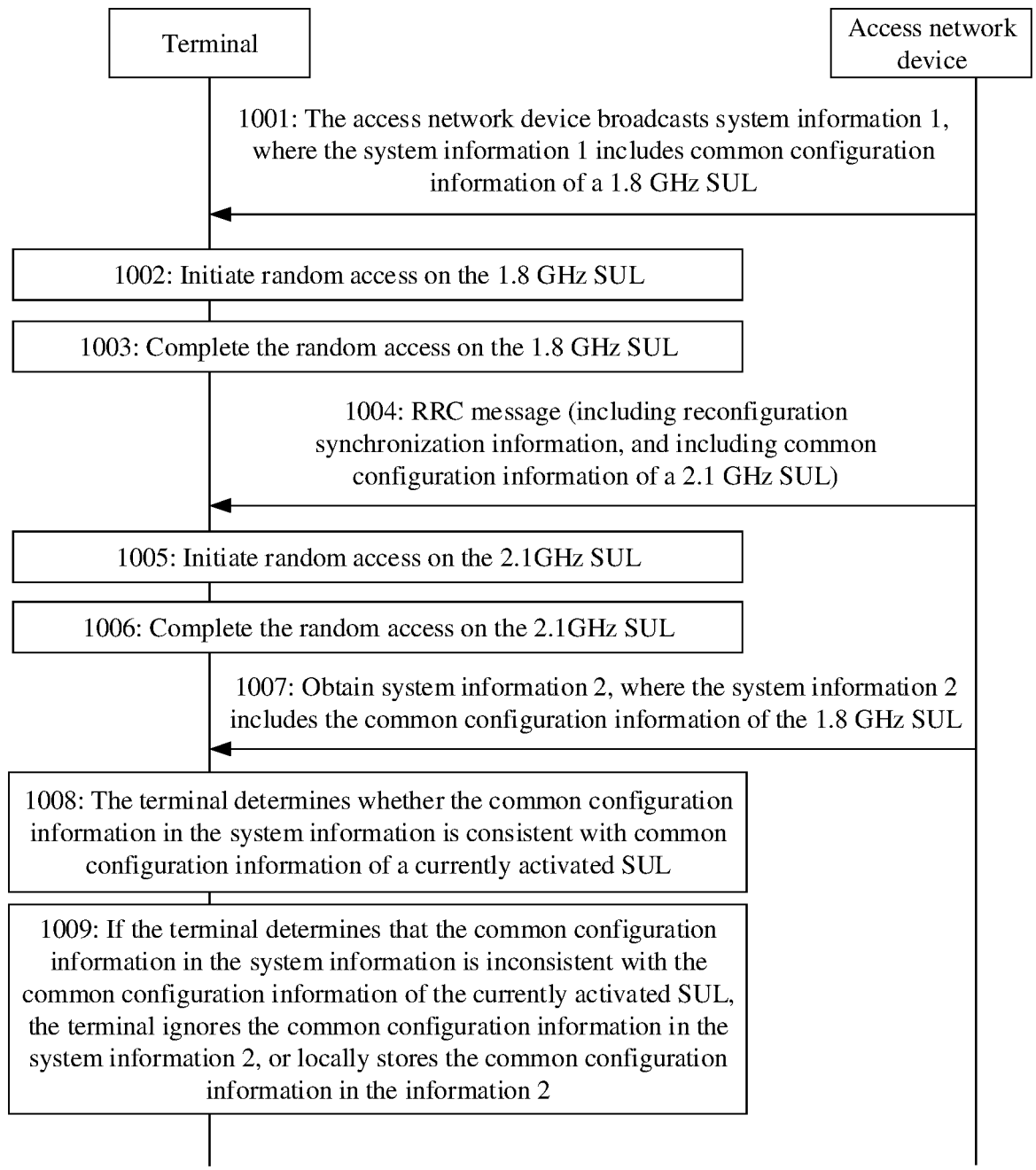
FIG. 9 is another schematic flowchart of an SUL configuration method according to an embodiment of this application.

The following further describes the method in FIG. 7 with reference to a specific example. Content in FIG. 9 and content in FIG. 7 may be mutually referenced. The following uses an example in which a 1.8 GHz SUL and a 2.1 GHz SUL are configured in a 5G mobile communication system (3.5G TDD NR). It should be noted that the content in FIG. 9 is applicable to an SUL that has another frequency, for example, the 1.8 GHz SUL may be the first SUL in FIG. 7, and the 2.1 GHz SUL may be the second SUL in FIG. 7. Refer to FIG. 9. The method includes the following steps.

1001: An access network device broadcasts system information 1, where the system information 1 includes common configuration information of the 1.8 GHz SUL.

It should be noted that the common configuration information is the first configuration information described in the embodiments of this application. The access network device broadcasts, in the system information, common configuration information of one of a plurality of SULs configured for a cell, for example, broadcasts an SUL that has a highest priority. In this embodiment of this application, it is assumed that a priority of the 1.8 GHz SUL is higher than a priority of the 2.1 GHz SUL. In a specific implementation, a priority of each SUL is not limited to examples in this embodiment of this application. The priority of each SUL is not limited in this embodiment of this application.

1002: A terminal initiates random access on the 1.8 GHz SUL.

In a specific implementation, in step 1002, when the terminal is in an idle state, the terminal may send a Msg1 to the access network device, and initiate the random access on the 1.8 GHz SUL.

1003: The terminal completes the random access on the 1.8 GHz SUL.

The terminal receives a Msg4 from the access network device, and obtains dedicated configuration information of the 1.8 GHz SUL from the Msg4. The dedicated configuration information is the second configuration information described in the embodiments of this application. The terminal may access the 1.8 GHz SUL based on the dedicated configuration information of the 1.8 GHz SUL and the common configuration information of the 1.8 GHz SUL, to complete the random access on the 1.8 GHz SUL.

1004: The access network device sends an RRC message to the terminal, where the RRC message includes ReconfigurationWithSync (reconfiguration synchronization) information, and the ReconfigurationWithSync information includes common configuration information of the 2.1 GHz SUL.

1005: The terminal initiates random access on the 2.1 GHz SUL based on the ReconfigurationWithSync information, and sends the Msg1 to the access network device.

1006: The terminal completes the random access on the 2.1 GHz SUL.

In a specific implementation, the terminal receives the Msg4 from the access network device, and completes the random access on the 2.1 GHz SUL. In addition, the terminal obtains dedicated configuration information of the 2.1 GHz SUL from the Msg4, and performs uplink transmission on the 2.1 GHz SUL based on the dedicated configuration information of the 2.1 GHz SUL and the common configuration information of the 2.1 GHz SUL.

1007: The terminal obtains system information 2, where the system information 2 includes the common configuration information of the 1.8 GHz SUL.

In a specific implementation, when the terminal is in a connected state, and receives system information change notification or determines that a system information timer expires, the terminal actively receives the system information.

1008: The terminal determines whether the common configuration information in the system information is consistent with common configuration information of a currently activated SUL.

1009: If the terminal determines that the common configuration information in the system information is inconsistent with the common configuration information of the currently activated SUL, the terminal ignores the common configuration information in the system information 2, or locally stores the common configuration information in the information 2.

It should be noted that the terminal considers by default that an SUL last configured by using the RRC message is an activated SUL, that is, the 2.1 GHz SUL, and the terminal still performs uplink transmission on the 2.1 GHz SUL.

In this embodiment of this application, a plurality of SULs may be supported, to improve an uplink user capacity. The access network device broadcasts, in the system information, common configuration information of an SUL, and the terminal may initiate random access on the SUL based on the system information. When load of the currently activated SUL of the terminal is relatively heavy, the terminal may re-initiate random access based on an indication of the access network device, and switch to another SUL (for example, an SUL that has relatively low load), so that user experience is improved.

Figure 10:
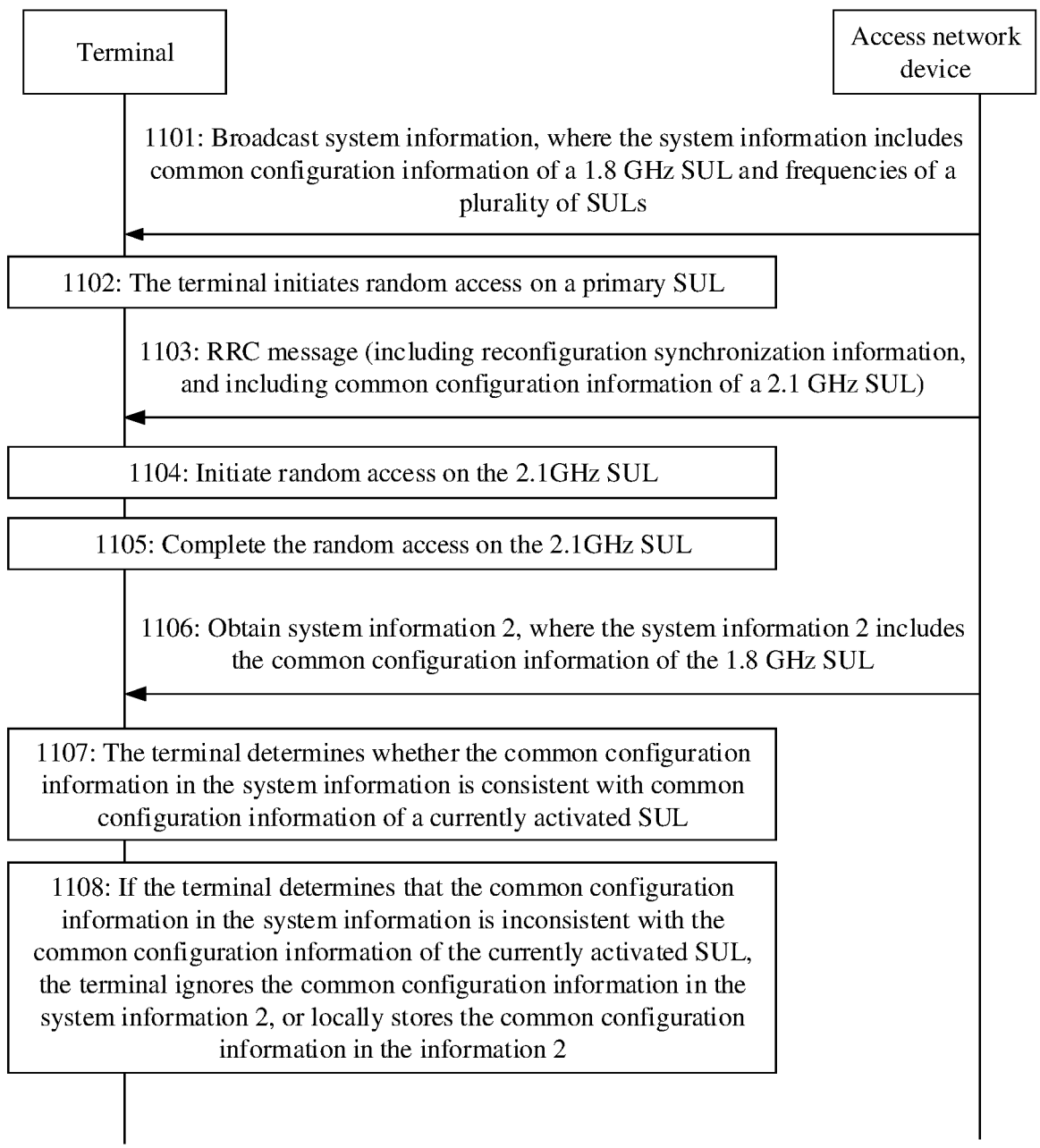
FIG. 10 is another schematic flowchart of an SUL configuration method according to an embodiment of this application.

The following further describes the method in FIG. 7 with reference to a specific example. Content in FIG. 10 and the content in FIG. 7 may be mutually referenced. The following uses an example in which a 1.8 GHz SUL and a 2.1 GHz SUL are configured in a 5G mobile communication system (3.5G TDD NR). It should be noted that the content in FIG. 10 is applicable to an SUL that has another frequency, for example, the 1.8 GHz SUL may be the first SUL in FIG. 7, and the 2.1 GHz SUL may be the second SUL in FIG. 7. Refer to FIG. 10. The method includes the following steps.

1101: An access network device broadcasts system information, where the system information includes common configuration information of the 1.8 GHz SUL and frequencies of a plurality of SULs.

In a specific implementation, the access network device broadcasts, in the system information, common configuration information of one of the plurality of SULs configured for a cell, for example, broadcasts an SUL that has a highest priority. In this embodiment of this application, it is assumed that a priority of the 1.8 GHz SUL is higher than a priority of the 2.1 GHz SUL. In a specific implementation, a priority of each SUL is not limited to examples in this embodiment of this application. The priority of each SUL is not limited in this embodiment of this application.

A plurality of frequencies included in the system information are in a one-to-one correspondence with the plurality of SULs configured for the access network device. For example, the system information includes a frequency of the 1.8 GHz SUL and a frequency of the 2.1 GHz SUL.

In addition, the access network device may add a list to a FrequencyInfoUL-SIB, where the list includes the plurality of frequencies. In a possible implementation, the common configuration information in the system information takes effect only for one SUL. For example, an SUL for which the common configuration information takes effect is an SUL corresponding to the $1^{st}$ frequency in the list, for example, the 1.8 GHz SUL. Certainly, the SUL for which the common configuration information takes effect may alternatively be another SUL. This is not limited in this embodiment of this application. In this embodiment of this application, the SUL for which the common configuration information takes effect may be referred to as a primary SUL.

The access network device notifies the terminal of a frequency of another SUL, so that the terminal learns that an SUL corresponding to another frequency may be reconfigured as an SUL of the terminal by using an RRC message.

For example, the protocol 38.331 (section 6.3.2) records a FrequencyInfoUL-SIB information element. In the method provided in this embodiment of this application, an absoluteFrequencyPointAlist may be added to the FrequencyInfoUL-SIB information element. The absoluteFrequencyPointAlist includes the frequencies of the plurality of SULs configured for the access network device.

1102: The terminal initiates random access on the primary SUL.

In step 1102, when the terminal is in an idle state, the terminal may send a Msg1 to the access network device, and initiate random access on the 1.8 GHz SUL. Subsequently, the terminal receives a Msg4 from the access network device, and completes the random access on the primary SUL. The terminal may further obtain dedicated configuration information of the 1.8 GHz SUL from the Msg4. The terminal may perform uplink transmission on the 1.8 GHz SUL based on the dedicated configuration information of the 1.8 GHz SUL and the common configuration information of the 1.8 GHz SUL.

1103: The access network device sends the RRC message to the terminal, where the RRC message includes ReconfigurationWithSync (reconfiguration synchronization) information, and the ReconfigurationWithSync information includes common configuration information of the 2.1 GHz SUL.

1104: The terminal initiates random access on the 2.1 GHz SUL based on the ReconfigurationWithSync information, and sends the Msg1 to the access network device.

1105: The terminal completes the random access on the 2.1 GHz SUL.

In a specific implementation, the terminal receives the Msg4 from the access network device, and establishes an RRC connection to the access network device on the 2.1 GHz SUL. It may be considered that the terminal completes the random access on the 2.1 GHz SUL. The terminal may further obtain dedicated configuration information of the 2.1 GHz SUL from the Msg4, and access the 2.1 GHz SUL based on the dedicated configuration information of the 2.1 GHz SUL and the common configuration information of the 2.1 GHz SUL, to complete the random access on the 2.1 GHz SUL.

1106: The terminal obtains system information 2, where the system information 2 includes the common configuration information of the 1.8 GHz SUL.

In a specific implementation, when the terminal is in a connected state, and receives system information change notification or determines that a system information timer expires, the terminal actively receives the system information.

1107: The terminal determines whether the common configuration information in the system information is consistent with common configuration information of a currently activated SUL.

1108: If the terminal determines that the common configuration information in the system information is inconsistent with the common configuration information of the currently activated SUL, the terminal ignores the common configuration information in the system information 2, or locally stores the common configuration information in the information 2.

It should be noted that the terminal considers by default that an SUL last configured by using the RRC message is an activated SUL, that is, the 2.1 GHz SUL, and the terminal still performs uplink transmission on the 2.1 GHz SUL.

In this embodiment of this application, the access network device may support the plurality of SULs, so that a user capacity of the SUL is improved, and an uplink user capacity of a communication system is further improved. The access network device broadcasts, in the system information, common configuration information of an SUL, and the terminal may initiate random access on the SUL based on the system information. When load of the currently activated SUL of the terminal is relatively heavy, the terminal may re-initiate random access based on an indication of the access network device, and switch to another SUL (for example, an SUL that has relatively low load), so that user experience is improved.

Figure 11:
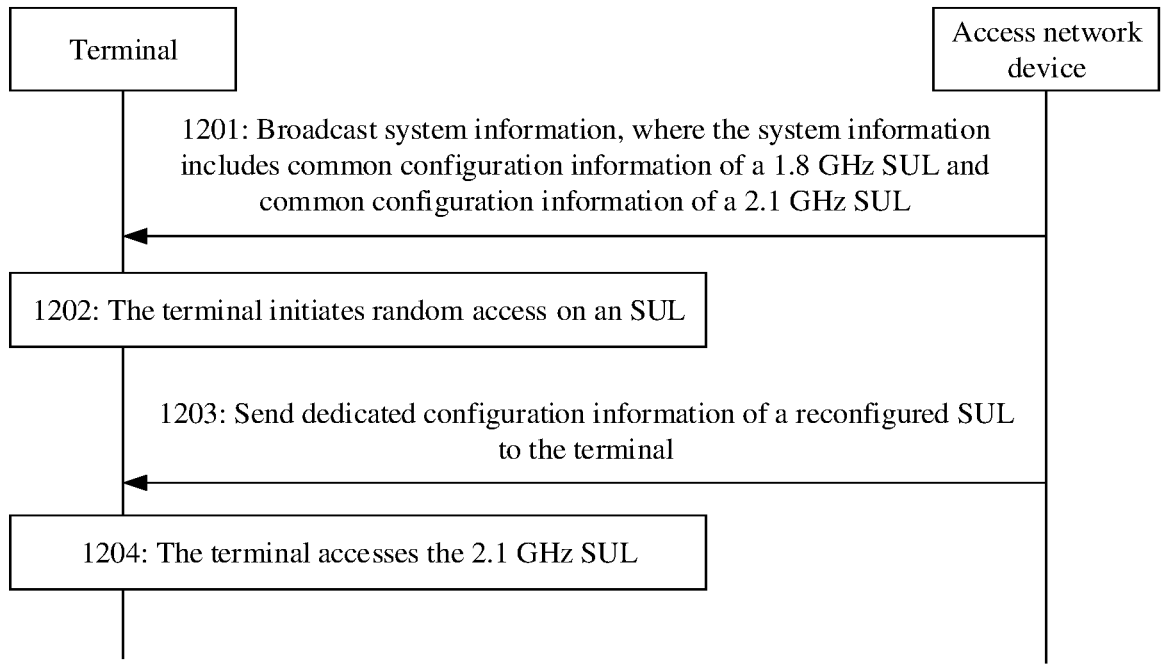
FIG. 11 is another schematic flowchart of an SUL configuration method according to an embodiment of this application.

The following further describes the method in FIG. 8 with reference to a specific example. Content in FIG. 11 and content in FIG. 8 may be mutually referenced. FIG. 11 is described by using an example in which a 1.8 GHz SUL and a 2.1 GHz SUL are configured in a 5G mobile communication system (3.5G TDD NR). N SULs in FIG. 8 may include the 1.8 GHz SUL and the 2.1 GHz SUL. It should be noted that the content in FIG. 11 is applicable to an SUL that has another frequency. For example, the 1.8 GHz SUL may be the first SUL in the embodiment in FIG. 8, and the 2.1 GHz SUL may be the second SUL in the embodiment in FIG. 8. Refer to FIG. 11. The method includes the following steps:

1201: An access network device broadcasts system information, where the system information includes common configuration information of the 1.8 GHz SUL and common configuration information of the 2.1 GHz SUL.

In a specific implementation, the access network device broadcasts, in using the system information, common configuration information of a plurality of SULs supported by a cell. For example, the common configuration information of the plurality of SULs supported by the cell is added to a supplementaryUplink information element in the system information. After receiving the system information, a terminal device may obtain, from the obtained system information, the common configuration information of the plurality of SULs supported by the cell.

For example, the protocol 38.331 (section 6.3.2) records a ServingCellConfigCommonSIB information element. In this embodiment of this application, a supplementaryUplinkList may be added to the ServingCellConfigCommonSIB information element. The supplementaryUplinkList includes the common configuration information of the plurality of SULs configured for the access network device.

1202: The terminal initiates random access on an SUL (for example, the 1.8 GHz SUL).

In a specific implementation, when the terminal is in an idle mode, the terminal may initiate random access on a default SUL, for example, the 1.8 GHz SUL. Alternatively, the terminal initiates random access on an SUL that has a highest priority, or the terminal initiates random access on an SUL indicated by the access network device.

1203: The access network device sends dedicated configuration information of a reconfigured SUL to the terminal.

In a specific implementation, the access network device may select a proper SUL from the plurality of SULs configured for the access network device, and reconfigures the proper SUL for the terminal. For example, if load of an SUL currently accessed by the terminal is relatively heavy and link quality deteriorates, the access network device may reconfigure an SUL that has relatively low load and relatively good link quality for the terminal.

For example, the terminal accesses the 1.8 GHz SUL in step 1202, then enters a connected state, and may receive an RRC message from the access network device. The access network device may send the RRC message to the terminal, to reconfigure the 2.1 GHz SUL for the terminal.

1204: The terminal accesses the common configuration information of the 2.1 GHz SUL.

Because the terminal has obtained the common configuration information of the 2.1 GHz SUL in step 1201, a base station sends dedicated configuration information of the 2.1 GHz SUL and a frequency of the 2.1 GHz SUL to the terminal by using the RRC message. The terminal may determine, based on the frequency of the 2.1 GHz SUL, that dedicated configuration information obtained from the RRC message is the dedicated configuration information of the 2.1 GHz SUL. The terminal may further switch from the 1.8 GHz SUL to the 2.1 GHz SUL based on the common configuration information and the dedicated configuration information of the 2.1 GHz SUL, without re-initiating random access.

In a possible implementation, the access network device may alternatively deliver ReconfigurationWithSync information to the terminal by using the RRC message, where the ReconfigurationWithSync information includes common configuration information of the reconfigured SUL. The terminal may initiate random access on the reconfigured SUL based on the ReconfigurationWithSync information. Then, the terminal obtains the dedicated configuration information of the reconfigured SUL by using a Msg4 delivered by the access network device, and accesses a new SUL based on the dedicated configuration information and the common configuration information of the reconfigured SUL.

In this embodiment of this application, the access network device may support the plurality of SULs, so that a user capacity of the SUL is improved, and an uplink user capacity of a communication system is further improved. The access network device broadcasts, in the system information, the common configuration information of the plurality of SULs, and the terminal may store received common configuration information. When load of an SUL currently activated by the terminal is heavy, the terminal may obtain, based on the RRC message, the dedicated configuration information of the reconfigured SUL, and switch to another SUL (for example, an SUL that has relatively low load), without performing random access, so that a latency is reduced, and user experience is improved.

In a possible embodiment, the communication system shown in FIG. 1 supports spectrum sharing, that is, cells of different RATs share different frequency bands in a spectrum.

Figure 12:
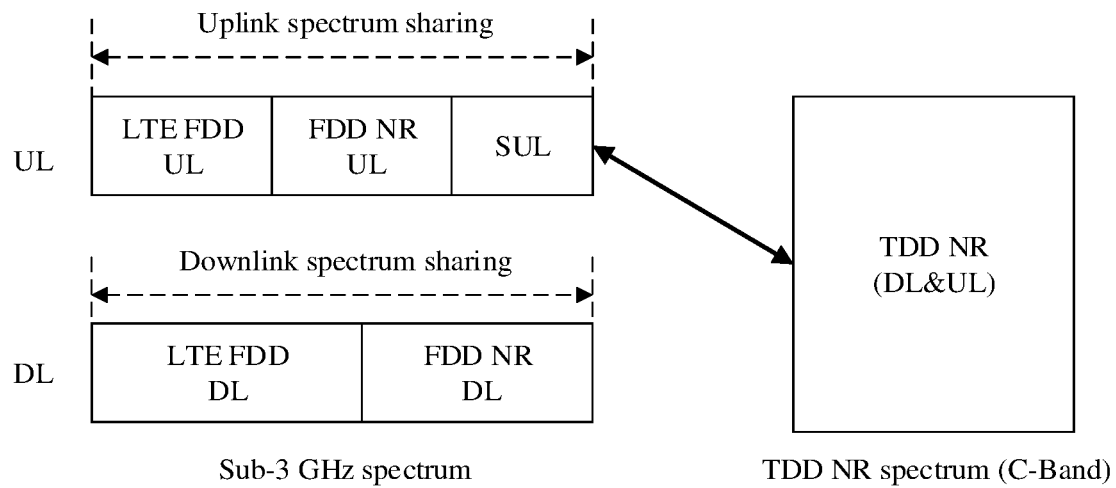
FIG. 12 is a schematic diagram of spectrum sharing according to an embodiment of this application.

In a related solution, refer to FIG. 12. An FDD LTE UL spectrum needs to support cells of three standards including LTE, NR, and SUL. The FDD LTE UL spectrum is classified into an FDD LTE UL frequency band, an FDD NR UL frequency band, and an SUL frequency band. The FDD LTE UL spectrum is a spectrum supporting an FDD LTE uplink cell.

The FDD LTE UL frequency band and an FDD LTE DL frequency band form a spectrum resource of an FDD LTE system, and the FDD NR UL frequency band and an FDD NR DL frequency band form a spectrum resource of an FDD NR system. A TDD NR system occupies same spectrum resources on an uplink and a downlink. That is, a TDD NR UL frequency band is the same as a TDD NR DL frequency band. An SUL is decoupled from TDD NR on the uplink and the downlink, that is, uplink transmission between a terminal and an access network device is performed on the SUL, and downlink transmission between the terminal and the access network device is performed on the TDD NR.

It should be noted that, if an FDD NR DL and the TDD NR form downlink carrier aggregation (CA), the SUL is used as a supplementary uplink of the TDD NR.

If the terminal uses the TDD NR as a primary carrier, the terminal may perform random access on an NUL or the SUL. If the terminal uses the FDD NR as the primary carrier, the terminal performs random access on the FDD NR UL. If the terminal does not support CA, the terminal performs access on the FDD NR UL or the SUL or the NUL of the TDD NR.

In a spectrum sharing scenario, cells of different standards need to occupy control channels, resulting in increased overheads. In addition, supporting spectrum sharing of three standards requires higher product complexity and lower sharing efficiency.

This embodiment of this application provides a solution. A segment of spectrum may support a plurality of cells of different standards, and the plurality of cells may occupy an entire spectrum. When configuring the plurality of cells, an access network may configure the plurality of cells as same cells, for example, configure same PUCCH configuration information for the plurality of cells.

For example, the access network device may configure the same PUCCH configuration information for the cell in the following two manners. Details are as follows:

In the first manner, the access network device sends PUCCH configuration information of a first cell by using the first cell, and the access network device sends PUCCH configuration information of a second cell by using the second cell. The PUCCH configuration information of the first cell is the same as the PUCCH configuration information of the second cell, and a frequency of the first cell is the same as a frequency of the second cell.

In a specific implementation, the access network device may broadcast the PUCCH configuration information of the first cell by using the first cell, or may send the PUCCH configuration information of the first cell to the terminal in a unicast manner by using the first cell.

The access network device may broadcast the PUCCH configuration information of the second cell by using the second cell, or may send the PUCCH configuration information of the second cell to the terminal in the unicast manner by using the second cell.

In a possible implementation, the PUCCH configuration information includes at least one of a PUCCH resource set and a frequency hopping ID.

In a specific implementation, the PUCCH resource set may include Pucch-resource common. For detailed descriptions of the Pucch-resource common, refer to section 6.3.2 (version F-40) in the 36.331 protocol.

In the second manner, the access network device obtains and receives PUCCH configuration information of a first cell, and obtains PUCCH configuration information of a second cell. The PUCCH configuration information of the first cell is the same as the PUCCH configuration information of the second cell, and a frequency of the first cell is the same as a frequency of the second cell.

In a specific implementation, a gateway may configure PUCCH configuration information of the cell for the access network device, and the access network device may receive the PUCCH configuration information of the first cell and the PUCCH configuration information of the second cell that are input by a network management system.

Alternatively, the PUCCH configuration information of the first cell and the PUCCH configuration information of the second cell may be internally preconfigured by the access network device.

In a possible implementation, the configuration information includes an RB location and a quantity of RBs.

It should be noted that the first manner and the second manner may be implemented in combination. To be specific, the access network device first obtains the PUCCH configuration information (denoted as configuration information 1) of the first cell and the PUCCH configuration information (denoted as configuration information 2) of the second cell. Then, specific configurations are performed based on the obtained configuration information, and specific configuration information is sent by using a corresponding cell. In a specific implementation, an actual PUCCH configuration of the first cell depends on the configuration information 1 obtained by the access network device. For example, the PUCCH configuration information that is of the first cell and that is broadcast by the access network device by using the first cell is a subset of the configuration information 1. An actual PUCCH configuration of the second cell depends on the configuration information 2 obtained by the access network device. For example, the PUCCH configuration information that is of the second cell and that is broadcast by the access network device by using the second cell is a subset of the configuration information 2.

For example, both the configuration information 1 and the configuration information 2 obtained by the access network device are RBs 0 to 9. The PUCCH configuration information that is of the first cell and that is broadcast by the access network device by using the first cell is the subset of the configuration information 1. For example, the broadcast PUCCH configuration information of the first cell indicates the RB 2. The PUCCH configuration information that is of the second cell and that is broadcast by the access network device by using the second cell is the subset of the configuration information 2. For example, the broadcast PUCCH configuration information of the second cell indicates the RB 4.

In this embodiment of this application, spectrum sharing between a plurality of cells is supported. When configuring the plurality of cells, the access network may configure the plurality of cells as same cells, for example, configure same PUCCH configuration information for the plurality of cells. Different cells occupy a same control channel. This reduces PUCCH overhead while supporting multi-standard spectrum sharing.

Figure 13:
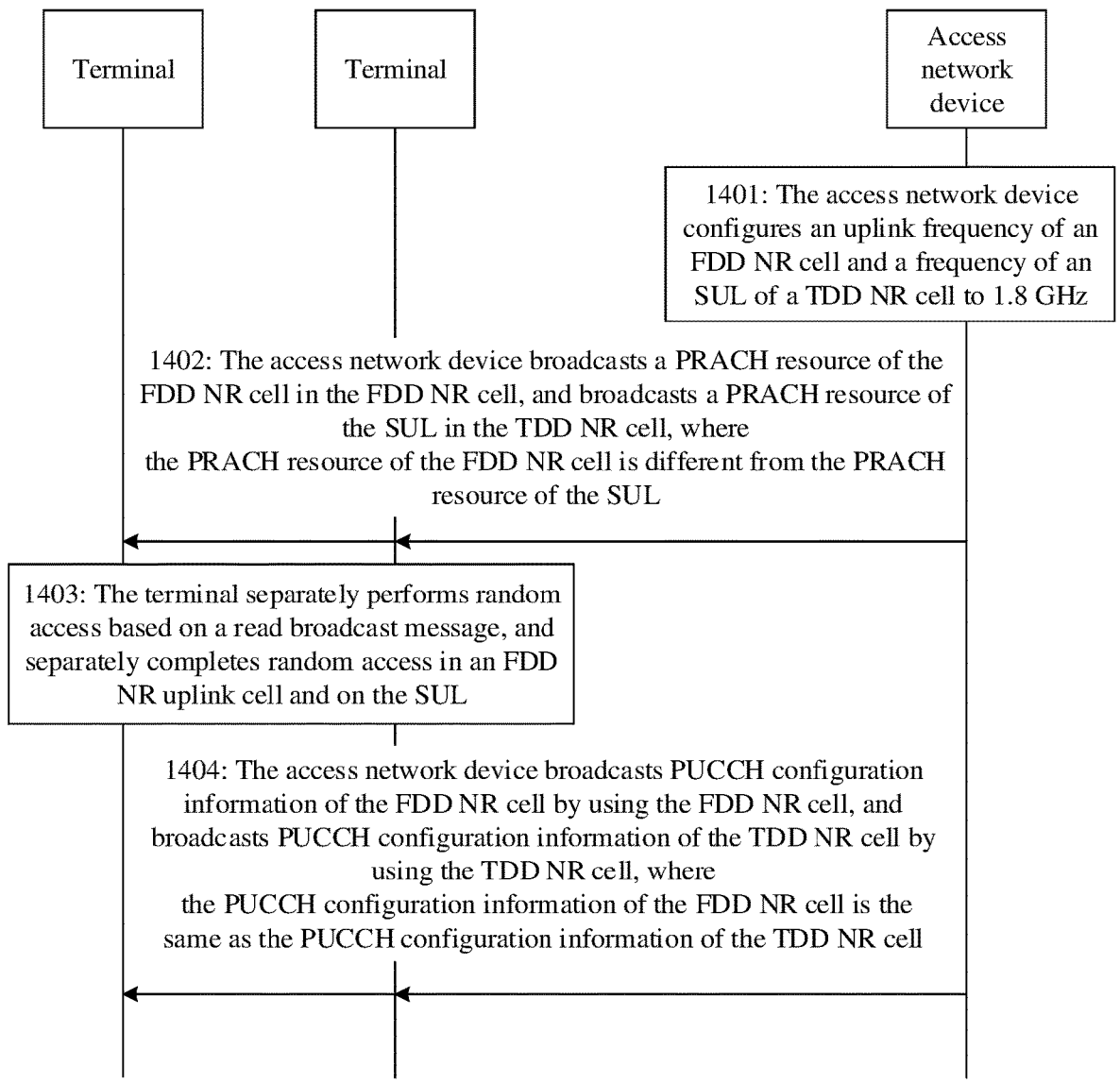
FIG. 13 is a schematic flowchart of a configuration method according to an embodiment of this application.

For example, in a scenario in which spectrum sharing between a TDD NR cell and an FDD NR cell is supported, same PUCCH configuration information may be configured for the TDD NR cell and the FDD NR cell. The TDD NR cell and the FDD NR cell may occupy the same control channel, thus reducing the PUCCH overhead. Refer to FIG. 13. The following steps are specifically included.

1401: An access network device configures an uplink frequency of an FDD NR cell and a frequency of an SUL of a TDD NR cell to 1.8 GHz.

In a possible implementation, the uplink frequency of the FDD NR cell and the frequency of the SUL may be the same. For example, the uplink frequency of the FDD NR cell is configured to 1820 MHz, and the frequency of the SUL of the TDD NR cell is also configured to 1820 MHz.

1402: The access network device broadcasts a PRACH resource of the FDD NR cell in the FDD NR cell, and broadcasts a PRACH resource of the SUL in the TDD NR cell. The PRACH resource of the FDD NR cell is different from the PRACH resource of the SUL.

In a specific implementation, the access network device divides an uplink PRACH resource of the FDD NR into two parts. One part is used to initiate random access in the FDD NR to access an FDD NR uplink cell, and the other part is used to initiate random access in the TDD NR to access the SUL.

1403: A terminal separately performs random access based on a read broadcast message, and separately completes random access in the FDD NR uplink cell and on the SUL.

Specifically, the access network device may determine, based on a received PRACH, whether the terminal performs access on the SUL or performs access in the FDD NR uplink cell. The access network device may further reply to the terminal with an RAR on a corresponding downlink, to complete an entire random access procedure.

1404: The access network device broadcasts PUCCH configuration information of the FDD NR cell in the FDD NR cell, and broadcasts PUCCH configuration information of the TDD NR cell in the TDD NR cell. The PUCCH configuration information of the FDD NR cell is the same as the PUCCH configuration information of the TDD NR cell.

In a specific implementation, the access network device may use the FDD NR uplink cell and the SUL as one logical cell to perform allocation and dynamic scheduling, for example, allocation and scheduling of a PUCCH, a PUSCH, and an SRS.

In addition, the PUCCH configuration information of the FDD NR cell may be used for an uplink of the FDD NR cell, and the PUCCH configuration information of the TDD NR cell may be used for an uplink of the TDD NR cell, for example, the SUL.

Figure 14:
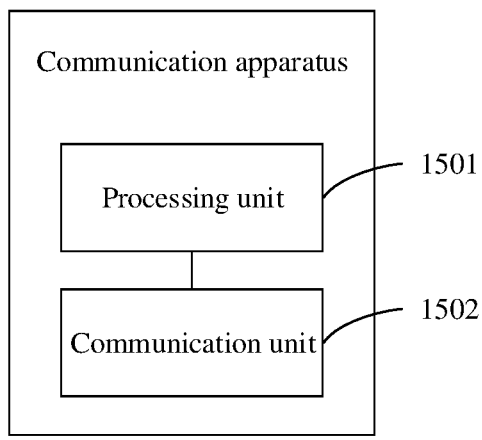
FIG. 14 is another block diagram of a structure of a communication apparatus according to an embodiment of this application.

When function modules are obtained through division based on corresponding functions, FIG. 14 is a possible schematic diagram of a structure of the communication apparatus in the foregoing embodiments. The communication apparatus shown in FIG. 14 may be the terminal described in this embodiment of this application, or may be a component that implements the foregoing method in the terminal, or may be a chip use in the terminal. The chip may be a system-on-a-chip (SOC), a baseband chip that has a communication function, or the like. As shown in FIG. 14, the communication apparatus includes a processing unit

1501 and a communication unit 1502. The processing unit may be one or more processors, and the communication unit may be a transceiver.

The processing unit 1501 is configured to support the terminal in performing step 802, step 902, and/or another process of the technology described in this specification.

The communication unit 1502 is configured to support communication between the communication apparatus and another communication apparatus, for example, support the terminal in performing step 801, step 901, and/or another process of the technology described in this specification.

It should be noted that all related content of the steps in the foregoing method embodiments may be cited in function descriptions of corresponding function modules. Details are not described herein again.

Figure 15:
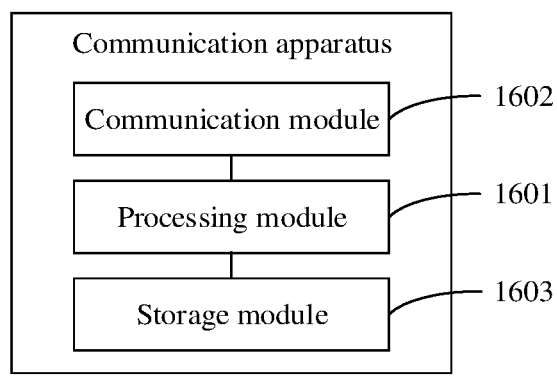
FIG. 15 is another block diagram of a structure of a communication apparatus according to an embodiment of this application.

For example, when an integrated unit is used, FIG. 15 is a schematic diagram of a structure of a communication apparatus according to an embodiment of this application. In FIG. 15, the communication apparatus includes a processing module 1601 and a communication module 1602. The processing module 1601 is configured to control and manage actions of the communication apparatus, for example, perform the step performed by the processing unit 1501, and/or another process in the technology described in this specification. The communication module 1602 is configured to perform the step performed by the communication unit 1502, and support interaction between the communication apparatus and another device, for example, interaction with another terminal apparatus. As shown in FIG. 15, the communication apparatus may further include a storage module 1603, and the storage module 1603 is configured to store program code and data of the communication apparatus.

When the processing module 1601 is a processor, the communication module 1602 is a transceiver, and the storage module 1603 is a memory, the communication apparatus is the communication apparatus shown in FIG. 6A.

Figure 16:
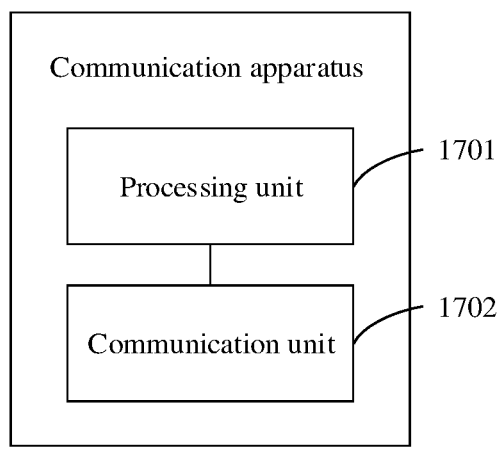
FIG. 16 is another block diagram of a structure of a communication apparatus according to an embodiment of this application.

When function modules are obtained through division based on corresponding functions, FIG. 16 is a possible schematic diagram of a structure of the communication apparatus in the foregoing embodiments. The communication apparatus shown in FIG. 16 may be the access network device described in the embodiments of this application, or may be a component that implements the foregoing method in the access network device, or may be a chip used in the access network device. The chip may be a system-on-a-chip (SOC), a baseband chip that has a communication function, or the like. As shown in FIG. 16, the communication apparatus includes a processing unit 1701 and a communication unit 1702. The processing unit may be one or more processors, and the communication unit may be a transceiver.

The processing unit 1701 is configured to support the access network device in performing internal processing, for example, generating system information or an RRC message, or determining a priority of an SUL, and/or is configured to perform another process of the technology described in this specification.

The communication unit 1702 is configured to support communication between the communication apparatus and another communication apparatus, for example, support the access network device in performing step 801, step 901, and/or another process of the technology described in this specification.

It should be noted that all related content of the steps in the foregoing method embodiments may be cited in function descriptions of corresponding function modules. Details are not described herein again.

Figure 17:
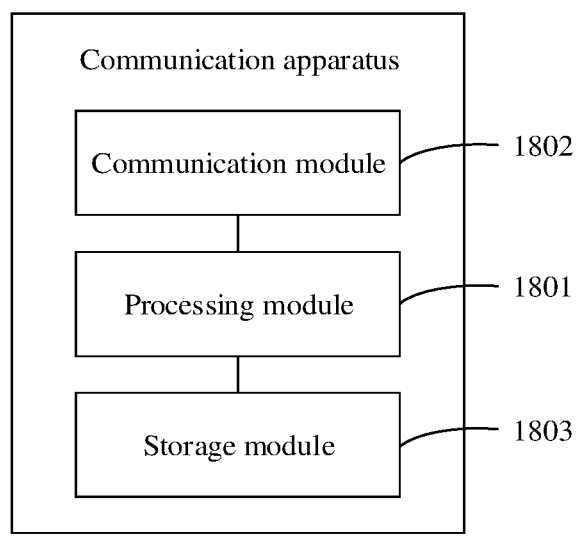
FIG. 17 is another block diagram of a structure of a communication apparatus according to an embodiment of this application.

For example, when an integrated unit is used, FIG. 17 is a schematic diagram of a structure of a communication apparatus according to an embodiment of this application. In FIG. 17, the communication apparatus includes a processing module 1801 and a communication module 1802. The processing module 1801 is configured to control and manage actions of the communication apparatus, for example, perform the step performed by the processing unit 1701, and/or another process in the technology described in this specification. The communication module 1802 is configured to perform the step performed by the communication unit 1702, and support interaction between the communication apparatus and another device, for example, interaction with another terminal apparatus. As shown in FIG. 17, the communication apparatus may further include a storage module 1803, and the storage module 1803 is configured to store program code and data of the communication apparatus.

When the processing module 1801 is a processor, the communication module 1802 is a transceiver, and the storage module 1803 is a memory, the communication apparatus is the communication apparatus shown in FIG. 6B.

An embodiment of this application provides a computer-readable storage medium. The computer-readable storage medium stores instructions. The instruction is used to perform the method shown in FIG. 7 or FIG. 8.

An embodiment of this application provides a computer program product including instructions. When the computer program product runs on a communication apparatus, the communication apparatus is enabled to perform the method shown in FIG. 7 or FIG. 8.

An embodiment of this application provides a wireless communication apparatus. The wireless communication apparatus stores instructions. When the wireless communication apparatus runs on the communication apparatuses shown in FIG. 6A, FIG. 6B, and FIG. 14 to FIG. 17, the communication apparatuses are enabled to perform the method shown in FIG. 7 or FIG. 8. The wireless communication apparatus may be a chip.

The foregoing descriptions about implementations allow a person skilled in the art to understand that, for the purpose of convenient and brief description, division of the foregoing function modules is used as an example for illustration. In actual application, the foregoing functions can be allocated to different function modules and implemented according to a requirement, that is, an inner structure of a database access apparatus is divided into different function modules to implement all or some of the functions described above.

The processor in this embodiment of this application may include but is not limited to at least one of the following computing devices that run software: a central processing unit (CPU), a microprocessor, a digital signal processor (DSP), a microcontroller unit (MCU), an artificial intelligence processor, or the like. Each computing device may include one or more cores configured to perform an operation or processing by executing software instructions. The processor may be an independent semiconductor chip, or may be integrated with another circuit to form a semiconductor chip. For example, the processor and another circuit (for example, an encoding/decoding circuit, a hardware acceleration circuit, or various buses and interface circuits) may form a SoC. Alternatively, the processor may be integrated into an ASIC as a built-in processor of the ASIC, and the ASIC integrated with the processor may be independently packaged or may be packaged with another circuit. In addition to the core configured to perform an operation or processing by executing a software instruction, the processor may further include a necessary hardware accelerator, for example, a field programmable gate array (FPGA), a PLD (programmable logic device), or a logic circuit that implements a dedicated logic operation.

In the embodiments of this application, the memory may include at least one of the following types: a read-only memory (ROM), another type of static storage device capable of storing static information and instructions, a random access memory (RAM), or another type of dynamic storage device capable of storing information and instructions, or may be an electrically erasable programmable read-only memory (EEPROM). In some scenarios, the memory may alternatively be a compact disc read-only memory (CD-ROM), another compact disc storage, optical disc storage (including a compact disc, a laser disc, an optical disc, a digital versatile disc, a Blu-ray disc, and the like), a magnetic disk storage medium, another magnetic storage device, or any other medium that can be configured to carry or store expected program code in a form of instructions or a data structure and that can be accessed by a computer, but is not limited thereto.

In this application, "at least one" refers to one or more. "A plurality of" refers to two or more than two. The term "and/or" describes an association relationship between associated objects, and indicates that three relationships may exist. For example, A and/or B may indicate the following cases: A exists alone, both A and B exist, and B exists alone, where A and B may be singular or plural. The character "/" generally indicates an "or" relationship between the associated objects. At least one of the following or a similar expression thereof indicates any combination of the following, and includes any combination of one or more of the following. For example, at least one of a, b, or c may indicate: a, b, c, a and b, a and c, b and c, or a, b, and c, where a, b, and c may be singular or plural. In addition, to clearly describe the technical solutions in the embodiments of this application, in the embodiments of this application, terms such as "first" and "second" are used to distinguish between same objects or similar objects whose functions and purposes are basically the same. A person skilled in the art may understand that the terms such as "first" and "second" do not limit a quantity and an execution sequence, and the terms such as "first" and "second" do not indicate a definite difference.

In the several embodiments provided in this application, it should be understood that the disclosed database access apparatus and method may be implemented in other manners. For example, the described database access apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the database access apparatuses or units may be implemented in electronic, mechanical, or other forms.

The units described as separate parts may or may not be physically separate, and parts displayed as units may be one or more physical units, may be located in one place, or may be distributed at different places. A part or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of the embodiments of this application essentially, or the part contributing to the conventional technology, or all or some of the technical solutions may be implemented in the form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a ROM, a RAM, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method comprising:
   after establishing a radio resource control (RRC) connection to an access network device on a first supplementary uplink (SUL), receiving configuration information of a second SUL from the access network device;
   initiating random access on the second SU; and
   before establishing the RRC connection to the access network device on the first SUL, receiving N pieces of frequency information of N SULs from the access network device, wherein the N pieces of frequency information are in a one-to-one correspondence with the N SULs, and wherein the N SULs comprise the first SUL and the second SUL,
   wherein a frequency of the second SUL is different from a frequency of the first SUL.

2. The method according to claim 1, further comprising:
   after initiating the random access on the second SUL, receiving configuration information of the first SUL from the access network device; and
   ignoring the configuration information of the first SUL or storing the configuration information of the first SUL.

3. The method according to claim 1, wherein the configuration information of the second SUL comprises the frequency of the second SUL.

4. The method according to claim 1, wherein the second SUL satisfies one or more of the following conditions: downlink reference signal receive power corresponding to the second SUL is greater than a first threshold, or a load of the second SUL is less than a second threshold.

5. The method according to claim 1, wherein the configuration information of the second SUL comprises an index of the second SUL.

6. The method according to claim 1, wherein the second SUL satisfies the following conditions: downlink reference signal receive power corresponding to the second SUL is greater than a first threshold and a load of the second SUL is less than a second threshold.

7. A method comprising:
after establishing a radio resource control (RRC) connection to a terminal on a first supplemental uplink (SUL), sending configuration information of a second SUL to the terminal, wherein a frequency of the second SUL is different from a frequency of the first SUL;
receiving a random access request message from the terminal on the second SUL; and
before establishing the RRC connection to the terminal on the first SUL, sending N pieces of frequency information of N SULs to the terminal, wherein the N pieces of frequency information are in a one-to-one correspondence with the N SULs, and wherein the N SULs comprise the first SUL and the second SUL.

8. The method according to claim 7, further comprising, after sending the configuration information of the second SUL to the terminal, sending configuration information of the first SUL to the terminal.

9. The method according to claim 6, wherein the configuration information of the second SUL comprises the frequency of the second SUL.

10. The method according to claim 7, wherein the second SUL satisfies one or more of the following conditions: downlink reference signal receive power corresponding to the second SUL is greater than a first threshold, or a load of the second SUL is less than a second threshold.

11. The method according to claim 7, wherein the configuration information of the second SUL comprises an index of the second SUL.

12. The method according to claim 7, wherein the second SUL satisfies the following conditions: downlink reference signal receive power corresponding to the second SUL is greater than a first threshold and a load of the second SUL is less than a second threshold.

13. A communication apparatus comprising:
a processor; and
a non-transitory storage medium coupled to the processor and storing executable instructions that, when executed by the processor, cause a terminal to:
after establishing a radio resource control (RRC) connection to an access network device on a first supplemental uplink (SUL), receive configuration information of a second SUL from the access network device;
initiate random access on the second SUL, wherein a frequency of the second SUL is different from a frequency of the first SUL; and
before establishing the RRC connection to the access network device on the first SUL, receive N pieces of frequency information of N SULs from the access network device, wherein the N pieces of frequency information are in a one-to-one correspondence with the N SULs, and wherein the N SULs comprise the first SUL and the second SUL.

14. The communication apparatus according to claim 13, wherein the executable instructions further comprise to cause the terminal to, after initiating the random access on the second SUL, receive configuration information of the first SUL from the access network device, and ignore the configuration information of the first SUL or store the configuration information of the first SUL.

15. The communication apparatus according to claim 13, wherein the configuration information of the second SUL comprises the frequency of the second SUL.

16. The communication apparatus according to claim 13, wherein the second SUL satisfies one or more of the following conditions: downlink reference signal receive power corresponding to the second SUL is greater than a first threshold, or a load of the second SUL is less than a second threshold.

17. The communication apparatus according to claim 13, wherein the configuration information of the second SUL comprises an index of the second SUL.

* * * * *

UNITED STATES PATENT AND TRADEMARK OFFICE
CERTIFICATE OF CORRECTION

PATENT NO. : 12,035,395 B2  
APPLICATION NO. : 17/643695  
DATED : July 9, 2024  
INVENTOR(S) : Ge et al.

Page 1 of 1

It is certified that error appears in the above-identified patent and that said Letters Patent is hereby corrected as shown below:

In the Claims

In Column 41, in Claim 9, Line 20, delete "claim 6," and insert -- claim 7, --.

Signed and Sealed this  
Twenty-seventh Day of August, 2024

Katherine Kelly Vidal  
*Director of the United States Patent and Trademark Office*